(12) United States Patent
Rudolph et al.

(10) Patent No.: US 9,880,445 B1
(45) Date of Patent: Jan. 30, 2018

(54) HARMONIC GENERATION USING OPTIMIZED STACK OF THIN FILMS

(71) Applicant: STC.UNM, Albuquerque, NM (US)

(72) Inventors: Wolfgang G. Rudolph, Albuquerque, NM (US); Cristina Rodriguez, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 14/744,909

(22) Filed: Jun. 19, 2015

(51) Int. Cl.
| | | |
|---|---|---|
| *G02F 1/35* | (2006.01) | |
| *G02F 1/37* | (2006.01) | |
| *H01S 3/00* | (2006.01) | |
| *G02F 2/02* | (2006.01) | |

(52) U.S. Cl.
CPC .............. *G02F 1/37* (2013.01); *H01S 3/0092* (2013.01)

(58) Field of Classification Search
CPC .................................. G02F 1/37; H01S 3/0092
See application file for complete search history.

(56) References Cited

U.S. PATENT DOCUMENTS

| | | | | |
|---|---|---|---|---|
| 5,051,617 A | * | 9/1991 | Normandin | B82Y 20/00 359/326 |
| 6,744,552 B2 | * | 6/2004 | Scalora | B82Y 20/00 359/326 |
| 2003/0035972 A1 | * | 2/2003 | Hanson | B32B 7/02 428/480 |
| 2010/0208338 A1 | * | 8/2010 | Banerjee | G02B 5/281 359/359 |
| 2014/0211303 A1 | * | 7/2014 | Banerjee | G02B 5/085 359/359 |
| 2016/0178983 A1 | * | 6/2016 | Alloatti | G02F 1/0305 385/122 |
| 2017/0248831 A1 | * | 8/2017 | Rodriguez | G02F 1/3501 |

FOREIGN PATENT DOCUMENTS

JP    11288013 A  * 10/1999  ........... G02F 1/3558

OTHER PUBLICATIONS

Armstrong, J. A., et al., "Interactions between Light Waves in a Nonlinear Dielectric", *Physical Review*, 127(6), (1962), 1918-1939.
Bahabad, A., et al., "Quasi-phase-matching and dispersion characterization of harmonic generation in the perturbative regime using counterpropagating beams", *Optics Express*, 16(20), (Sep. 2008), 15923-15931.
Bartels, R. A., et al., "Phase-matching conditions for nonlinear frequency conversion by use of aligned molecular gases.", *Optics Letters*, 28(5), (2003), 346-348.
Bethune, D. S., et al., "Optical harmonic generation and mixing in multilayer media: analysis using optical transfer matrix techniques", *J. Opt. Soc. Am. B*, 6(5), (1989), 910-916.

(Continued)

*Primary Examiner* — Rhonda Peace
(74) *Attorney, Agent, or Firm* — Schwegman Lundberg & Woessner, P.A.

(57) ABSTRACT

Systems and methods implementing a stack on a substrate, where the stack includes a plurality of films structured as layers to convert radiation incident to the stack to radiation of a nonlinear optical signal different from the incident radiation or to a harmonic of the incident radiation, can be used in a variety of applications. The stack can be structured having parameters selected with respect to conversion efficiency and bandwidth the converted radiation. Additional systems and methods can be used in a variety of applications.

41 Claims, 25 Drawing Sheets

(56) References Cited

OTHER PUBLICATIONS

Fejer, M. M., et al., "Quasi-Phase-Matched Second Harmonic Generation Tuning and Tolerances", *IEEE J. Quantum Electron.*, 28(11), (Nov. 1992), 2631-2654.

Franken, P. A.. et al., "Optical Harmonics and Nonlinear Phenomena", *Reviews of Modern Physics*, 35(1), (Jan. 1963), 23-39.

Giordmaine, J. A., "Mixing of Light Beams in Crystals", *Physical Review Letters*, 8(1), (1962), 19-21.

Hartinger, K., et al., "Aligned molecular gases for quasi phase matching", In: *The 17th Annual Meeting of the IEEE Lasers and Electro-Optics Society, LEOS 2004*, vol. 2, (2004), 489-490.

Huang, C.-P., et al., "Third harmonic generation in a periodic structure with simultaneous linear and nonlinear modulation", *physica status sol.* (b) 242(8), (Jul. 2005), 1694-1699.

Hum, D. S., et al., "Quasi-phasematching", *Comptes Rendus Physique.* 8(2), (2007), 180-198.

Jensen, L. O., et al., "Investigations on $SiO_2/HfO_2$ mixtures for nanosecond and ferntosecond pulses", *Proc. of Spie. vol. 7842— Laser-Induced Damage in Optical Materials*, 784207-1, (2010), 10 pgs.

Juodkazis, S., et al., "Optical third harmonic generation during femtosecond pulse di raction in a Bragg grating.", *Journal of Physics D: Applied Physics*, 39(1), (Jan. 2006).

Maker, P. D., et al., "Effects of dispersion and focusing on the production of optical harmonics", *Physical Letters*, 8 (7), (1962), 21-22.

Markowicz, P., et al., "Dramatic Enhancement of Third-Harmonic Generation in Three-Dimensional Photonic Crystals", *Phys. Rev. Lett.*, 92(8):083903, (Feb. 2004), 4 pgs.

Sapaev, U. K., et al., "Quasi-phase-matching for third harmonic generation in noble gases employing ultrasound.", *Optics Express*, 20(20), (2012), 22753-22762.

Tsang, T., "Reflected optical harmonics from dielectric mirrors", *Applied Optics*, 33(33), (1994), 7720-7724.

Wang, B., et al., "A theorectical investigation of the laser damage threshold of metal multi-dialectric mirrors for high power ultrashort applications", *Optics Express*, 21(12), (2013), 14698-14711.

Williams, D. L., et al., "Quasi-phase matched third harmonic generation", *Opt.Commun.*, 148(1-3) (1998), 208-214.

\* cited by examiner

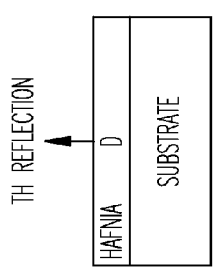
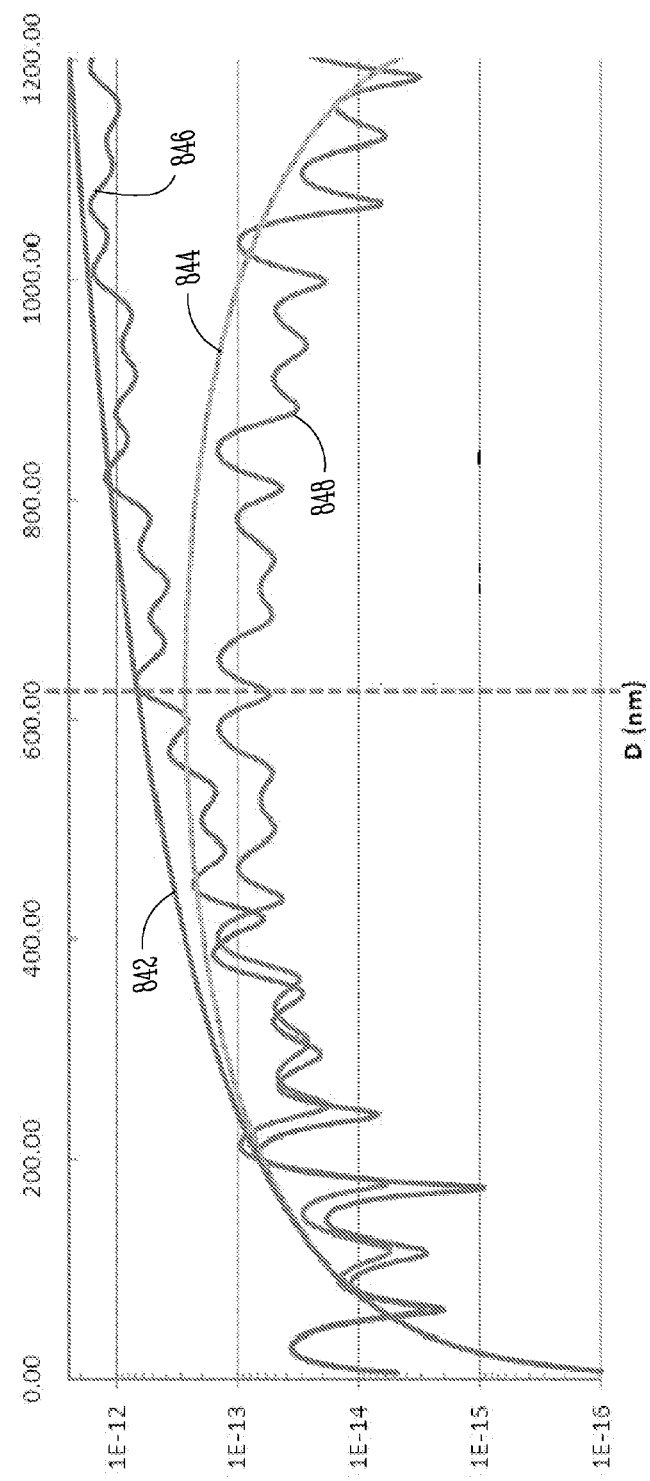
Fig.8A
Fig.8B

HARMONIC GENERATION USING OPTIMIZED STACK OF THIN FILMS

GOVERNMENT INTEREST STATEMENT

This invention was made with Government support under Grant: ARMY/Army Research Office No. W911NF 11-1-007. The United States Government has certain rights in the invention.

RELATED APPLICATION

This application claims priority under 35 U.S.C. 119(e) from U.S. Provisional Application Ser. No. 62/014,865, filed 20 Jun. 2014, which application is incorporated herein by reference in its entirety.

FIELD OF THE INVENTION

The invention relates generally to optical related structures, devices, and systems.

BACKGROUND

A limiting factor in the efficiency of using nonlinear optical harmonic generation to frequency convert laser radiation comes from phase mismatch between different frequency components of the interacting waves, resulting from material dispersion. This prevents the constructive addition of the nonlinear fields, which oscillate sinusoidally with propagation distance with a period of twice the coherence length ($L_{coh}$), where $L_{coh}$ is the distance over which the incident and nonlinear fields accumulate a relative phase of $\pi$. A wide range of techniques have been developed over the last decades to compensate for this phase mismatch, allowing the generated nonlinear signal to accumulate constructively over an extended propagation distance ($>L_{coh}$) and hence increase the efficiency of the frequency conversion process. A common procedure is to use crystal birefringence and adjust the polarization of the interacting waves in such a way that the phase velocities are matched.

Another method, known as quasi-phase-matching, is based on the idea that by having a periodic spatial modulation of the linear and/or nonlinear susceptibilities of a nonlinear medium, the relative phase between the interacting waves can be reset and the detrimental effects of phase mismatch on the conversion efficiency are fully or partially corrected, without matching the phase velocities. Periodic poling of ferroelectrics is a common way to achieve this.

To produce the third harmonic of femtosecond laser pulses, for example, to generate near ultraviolet light from near infrared sources, one typically follows a two-step process that generates the second harmonic first, using one crystal, and then mixes the latter with the fundamental, using a second crystal, to obtain radiation at $3\omega$. Efficiencies typically do not exceed 10%-15%. A more straightforward technique involves using the cubic nonlinearity of isotropic materials through direct third harmonic generation making use of some quasi-phase-matching technique. Several methods have been developed to achieve this, with efficiencies always falling below the two-step method described above.

BRIEF DESCRIPTION OF THE DRAWINGS

Embodiments of the invention are illustrated by way of example and not limitation in the figures of the accompanying drawings in which:

FIG. 7A is a schematic of one layer of hafnia on a substrate with respect to third harmonic generation in transmission, in accordance with various embodiments.

FIG. 7B are plots of third harmonic versus thickness for the one layer of hafnia configuration of FIG. 7A, in accordance with various embodiments.

FIG. 8A is a schematic of one layer of hafnia on a substrate with respect to third harmonic generation in reflection, in accordance with various embodiments.

FIG. 8B are plots of third harmonic versus thickness for the one layer of hafnia configuration of FIG. 8A, in accordance with various embodiments.

DETAILED DESCRIPTION

Figure 1:
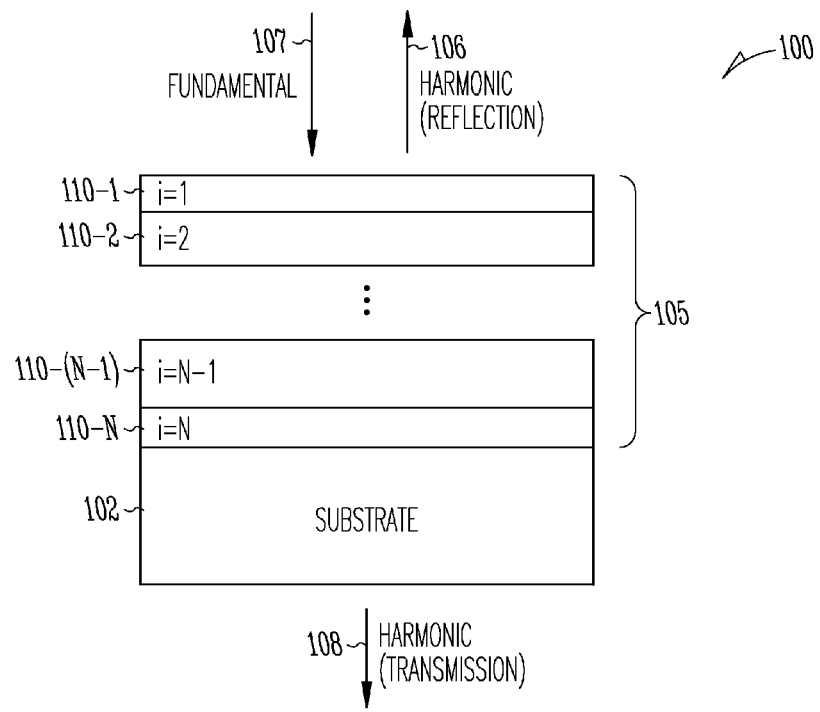
FIG. 1 is a representation of an embodiment of a general layout of a structure to provide harmonic generation using optimized stacks of thin films, in accordance with various embodiments.

The following detailed description refers to the accompanying drawings that show, by way of illustration and not limitation, various example embodiments of the invention. These embodiments are described in sufficient detail to enable those skilled in the art to practice these and other embodiments. In order to avoid obscuring embodiments of the invention, some well-known system configurations and process steps are not disclosed in detail. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, a stack of films can be used to frequency convert incident radiation using nonlinear optical harmonic generation. An incident laser beam (fundamental) of frequency $\omega$ (wavelength $\lambda$) can be converted to a frequency $n\omega$ (wavelength $\lambda/n$) where the integer n specifies the order of the harmonic. Samples can consist of stacks of films optimized with respect to the conversion efficiency and bandwidth of the directly generated third harmonic. Conversion efficiencies can exceed 20-30%. The stack design can also take into account permanent refractive index changes due to laser incubation (conditioning) and transient changes of the index due to nonlinear optical effects, for example the Kerr effect.

In various embodiments, a structure for conversion of incident radiation can be implemented based on a model of the interaction of incident radiation on the structure such that the structure has layers of dielectric materials selected according to a maximization of the output optical signal. In an approach, a number of layers is assumed along with limits (lower and upper) of their thicknesses depending on material and deposition constraints. A processing algorithm based on the model can be executed to find the sequence of individual layer thicknesses that maximizes the conversion efficiency. The resulting efficiency can be a combination of favorable phase behavior and local field enhancements in the layers that have nonzero nonlinear susceptibilities. Alternatively, with various constraints applied, the processing of the model can be implemented to determine the number of layers of films in the structure.

Stacks of films can be structured to generate a harmonic of the incident radiation to the stack. The harmonic can be selected according to an application. The harmonic may be, but is not limited to, a third harmonic. Stacks of films can also be designed to produce other nonlinear optical signals. In a nonlinear process of order n, up to n different optical fields can be mixed. The n input waves that can have different frequencies, polarizations, and propagation directions. A modified theoretical model can be applied to predict the optical field produced by a nonlinear optical process of order n. Stacks of films can be designed to maximize the output amplitude and optimize bandwidth and phase (chirp) behavior. Examples include wave mixing and parametric down conversion. In the latter, for example, an optical input wave of frequency $f_0$ produces two optical output fields of frequency $f_1$ and $f_2$, where $f_1+f_2=f_0$. The stack design can also take into account permanent refractive index changes due to laser incubation (conditioning) and transient changes of the index due to nonlinear optical effects, for example the Kerr effect.

FIG. 1 is a representation of an embodiment of a general layout of a structure 100 to provide harmonic generation using optimized stacks of thin films. A stack 105 of N films, 110-1, 110-2 . . . 110-(N−1), and 110-N is disposed on a substrate 102. Each film can be deposited in the stack using conventional fabrication techniques. Stack 105 can be made of films of N different materials and thicknesses. The film sequence can be optimized using computer algorithms to obtain maximum conversion efficiency over the desired bandwidth. The optimization can involve the type of material and the film thickness for each stack element as well as the overall number of films N. The bandwidth may be particularly important for the conversion of short laser pulses. The harmonic can be produced in reflection 106 and/or in transmission 108 from the fundamental 107 depending on the desired application and the stack optimization.

Previously developed techniques for achieving quasi-phase-matching involved the use of structures with a fixed periodicity. For example, when two different materials A and B are used in a stack, the thickness of each layer, $L_A$ and $L_B$, is fixed. Structures, as taught herein do not have this constraint. In such structures, once the number of layers and the materials are chosen, the thickness of each individual layer can be found by an optimization routine. The conversion efficiencies from such samples significantly exceed that of an equivalent sample with a fixed periodicity.

For example, by using materials with a nonlinear susceptibility ratio that is large enough (≥20) and different dispersion properties, the relative phases of the fundamental and harmonic waves reset, so nonlinear frequency conversion add constructively over an extended propagation distance. Furthermore, the optimized samples as taught herein provide compensation for destructive interference effects caused by group velocity mismatch and compensation for those destructive interference effects associated with multiple reflection effects. The latter compensation explains why the predicted conversion efficiencies exceed those from an equivalent perfectly phase-matched sample. Field enhancement due to multiple reflection effects in the stack of films also plays an important role in the high efficiencies. In various embodiments, methods for harmonic generation using thin films can also lead to stacks that ensure a larger conversion bandwidth, which is important for short laser pulses.

In the following, characterization of third harmonic generation in thin films is discussed. The discussion includes a model developed to describe the third harmonic signal generation in reflection and transmission from thin films or membranes on substrates. The model takes into account interference effects of fundamental and third harmonic (TH) waves in the film, the backward generated TH, and the pump beam profile. A significant improvement in contrast is expected using a reflection type geometry. The model is applied to retrieve, from experiment, nonlinear susceptibilities of hafnia/silica mixture ($Hf_xSi_{1-x}O_2$), alumina ($Al_2O_3$), and scandia ($Sc_2Os_3$) thin films.

The TH signal, often detected in transmission, is a sum of fields from the layer of interest and the surrounding material within the focal volume including the substrate. It has been suggested that by detecting the TH in reflection the contribution from the substrate could be considerably suppressed. When using this detection geometry, however, special attention has to be paid to the fact that not only forward generated TH contributes to the total signal measured, but also backward generated TH can have a significant contribution.

Herein, the relative TH contribution of a thin film and the substrate in both transmission and reflection geometry is analyzed, and parameter ranges in which the signal from the film dominates are defined. To this end, (i) the beam profile of the focused input field, (ii) interference effects of both fundamental and TH waves in the film, and (iii) forward and backward generated TH are taken into account. The model, discussed herein, is applied to determine nonlinear optical susceptibilities $X^{(3)}$ of various dielectric films from TH measurements.

Figure 2:
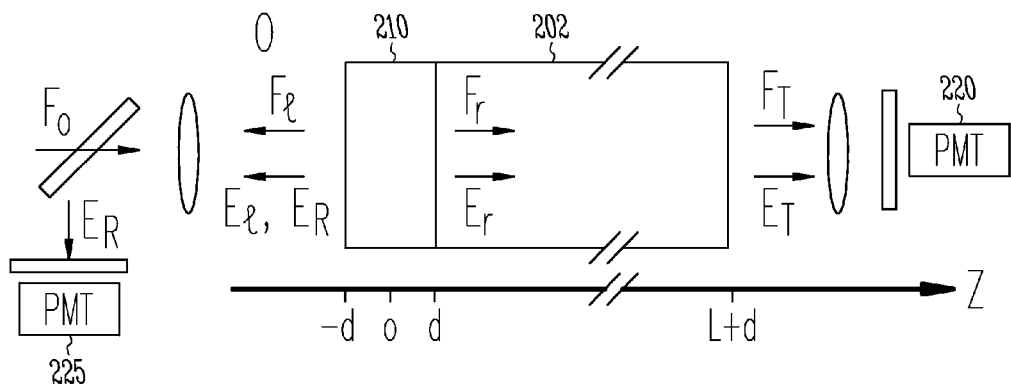
FIG. 2 is a schematic diagram of third harmonic signal generation and detection, in accordance with various embodiments.

FIG. 2 is a schematic diagram of TH signal generation and detection.

FIG. 2 shows third harmonic generation in a thin film 210 on a semi-infinite substrate 202 in reflection and transmission from an incident fundamental field $F_0$. A laser beam (incident electric field $F_0$) is focused onto thin film 210 (medium 1) deposited on a substrate 202 (medium 2) and the TH signals are detected in transmission (T) and reflection (R) geometry after appropriate filtering using photomultiplier tubes 220 and 225, respectively. The field transmission coefficients, reflection coefficients, refractive indices, and wave vectors for the fundamental (TH) are $t_{ij}$, $r_{ij}$, $\eta_j$, and $\kappa_j$ ($\Sigma_{ij}$, $\rho_{ij}$, $\eta_j$, and $\kappa_j$), where i,j=0, 1, 2 refers to air, film, and substrate, respectively. The TH fields propagating to the left and right, $E_l$ and $E_r$, are produced by nonlinear conversion in thin film 210 only, while the fields $E_R$ and $E_T$ also include contributions from the substrate 202.

A general matrix approach can be used to treat non-linear optical signal conversion of focused fundamental beams in a stack of layers of different optical properties taking into account multiple reflections of the interacting fields. Here, these results are used for the special case of a single film of thickness 2d<<$z_0$ much smaller than the Rayleigh range, $z_0$, and a substrate of thickness L>>$z_0$, and assumption of an incident Gaussian beam. Because of this geometry, the contribution of the field reflected at the output face of the substrate to $E_R$ can be neglected.

The TH field $E_T$ in the spatial frequency ($\rho$) domain is the sum of the field produced in the film, $E_r$, multiplied by the spatial frequency spectrum and the Fresnel propagator, and the field produced in the substrate, where $E_T(\rho)$ is given by:

$$E_T(\rho) = \tau_{20}\left[\frac{\pi\omega_0^2}{3}e^{-\pi^2\omega_0^2\rho^2/3}e^{ia\rho^2 L}E_r - b\int_0^L dz P_2(p,z)e^{-i\Delta k_2^- z}e^{ia\rho^2(L-z)}\right], \quad (1)$$

where $$a = 2\pi^2/\kappa_2, \quad b = \frac{9i\omega^2}{2c^2\kappa_2}\chi_2^{(3)},$$

$\Delta k_2^- = 3k_2 - \kappa_2$ is the wave-vector mismatch of co-propagating fundamental and TH waves in the substrate, and $P_2$ (p, z)=HT{$F^3(r, z)$} is the Hankel transform of the nonlinear polarization in the substrate. Since 2d<<$z_0$, the $\rho$ dependence of the phase of fundamental and harmonic fields introduced by the film may also be neglected. The latter implies that for each spectral frequency component $\rho$ the thin film response is that for a plane wave incident normally.

The fundamental field after the film subject to Fresnel diffraction is $F(\rho,z)=F_0 t_{01} t_{12} e^{-2ik_1 d}/(1+r_{01}r_{12}e^{-4idk_1})\pi\omega_0^2 e^{-\pi^2\omega_0^2\rho^2}e^{ia\rho^2(z-d)}$. The third-harmonic amplitude after the film can be written as:

$$E_r = H\tau_{12}e^{-ik_1 d} \times \{e^{-i\Delta k_1^- d}\text{sinc}(\Delta k_1^- d)(1-\rho_{01}r_{12}^3 e^{-2i\Delta k_1^+ d}) + \quad (2)$$
$$3r_{12}e^{-4ik_1 d}e^{-i\Delta\phi_1^+ d}\text{sinc}(\Delta\phi_1^+ d)(r_{12}e^{-2i\Delta\phi_1^+ d} - \rho_{01}) +$$
$$3r_{12}e^{-4ik_1 d}e^{-1\Delta\phi_1^- d}\text{sinc}(\Delta\phi_1^- d)(1-\rho_{01}r_{12}e^{-2i\Delta\phi_1^+ d}) +$$
$$e^{-i\Delta k_1^+ d}\text{sinc}(\Delta k_1^+ d)(r_{12}^3 e^{-2i\Delta k_1^- d} - \rho_{01})\},$$

where $$H = \frac{-9i\omega^2 \chi_1^{(3)} d(t_{01}F_0)^3}{\kappa_1 c^2 (1+\rho_{01}\rho_{12}e^{-4idk_1})(1+r_{01}r_{12}e^{-4idk_1})^3}, \quad (3)$$

and $\Delta k_1^{\mp} = 3k_1 \mp \kappa_1 (\Delta\varphi_1^{\mp} = k_1 \pm \kappa_1)$ is the wave vector mismatch for the forward (−) and backward (+) generated TH resulting from the mixing of co- (counter-) propagating fundamental fields in the film.

A similar procedure can be used to obtain the total TH field $E_R$ propagating to the left. Again, because 2d<<$z_0$, for each spectral frequency component, the nonlinear film response is that for a normally incident plane wave. The field $E_R(\rho)$ is the sum of TH produced in the film and backward generated TH in the substrate, and transmitted through the film, where $E_R(\rho)$ can be written as:

$$E_R(\rho) = \frac{\pi\omega_0^2}{3}e^{-\pi^2 w_0^2 \rho^2/3}E_l + \tag{4}$$

$$\frac{T_{21}T_{10}e^{-2i\kappa_1 d}}{1+\rho_{01}\rho_{12}e^{-4i\kappa_2 d}} \times b \int_0^L dz P_2(\rho,z)e^{-i\Delta\kappa_2^+ z}e^{ia\rho^2(d-z)},$$

where $\Delta k_2^+ = 3k_2 + \kappa_2$ is the wave-vector mismatch between the fundamental and TH waves for the backward generated TH in the substrate. The TH amplitude $E_l$ is given by:

$$E_l = H\tau_{10} \times \{e^{-i\Delta\kappa_1^- d}\text{sinc}(\Delta k_1^- d)(r_{12}^3 e^{-2i\Delta\kappa_1^+ d} + \rho_{12}e^{-4i\kappa_1 d}) + \tag{5}$$
$$3r_{12}e^{-4i\kappa_1 d}e^{-i\Delta\phi_1^+ d}\text{sinc}(\Delta\phi_1^+ d)(1+\rho_{01}r_{12}e^{-2i\Delta\phi_1^+ d}) +$$
$$3r_{12}e^{-4i\kappa_1 d}e^{-i\Delta\phi_1^- d}\text{sinc}(\Delta\phi_1^- d)(r_{12}e^{-2i\Delta\phi_1^+ d} + \rho_{12}e^{-4i\kappa_1 d}) +$$
$$e^{-i\Delta\kappa_1^+ d}\text{sinc}(\Delta k_1^+ d)(1+\rho_{12}r_{12}^3 e^{-2i\Delta\kappa_1^+ d})\}.$$

Depending on the reflection coefficients at the film interfaces, some of the terms in equations (2) and (5) can be neglected.

This model can be used to determine $X^{(3)}$ values of films by comparing the measured TH power in transmission or reflection, $\int |E_{R,T}(\rho)|^2 \rho d\rho$, to that obtained from the substrate alone for which the third-order susceptibility is known.

Figure 3A:
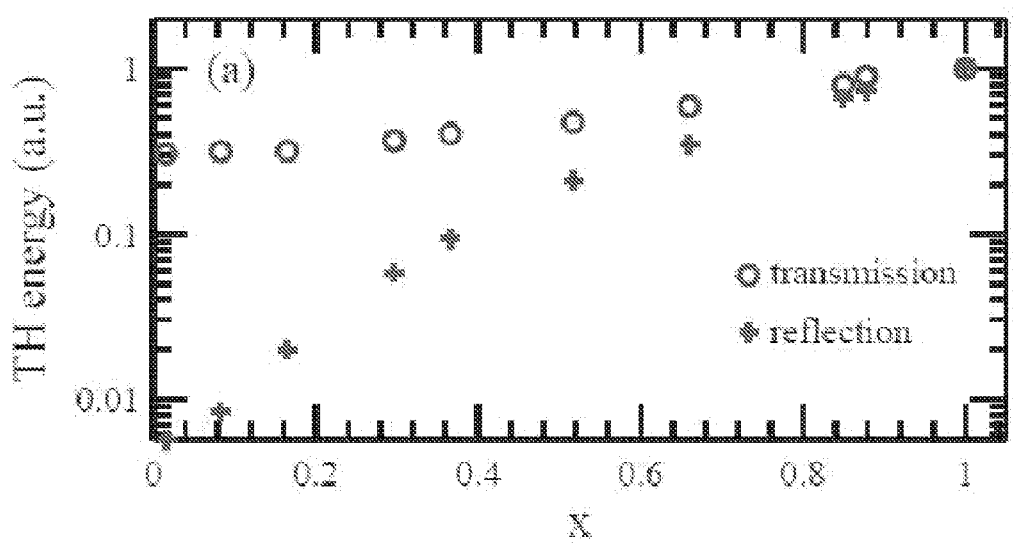
FIG. 3A shows measured third harmonic signal from $Hf_xSi_{1-x}O_2$ films sputtered on fused silica as a function of x, in accordance with various embodiments.
Figure 3B:
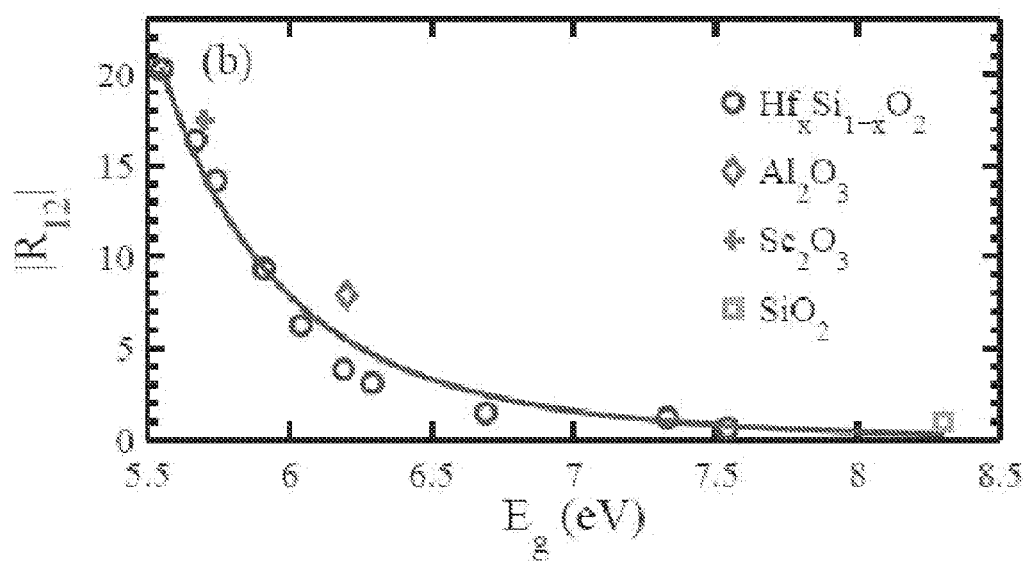
FIG. 3B shows measured ratio of third-order susceptibility of film and fused silica substrate as a function of the bandgap of the film material, in accordance with various embodiments.

Measurements were performed with the pulse train from a titanium:sapphire laser oscillator (790 nm, 50 fs, 113 MHz, linear polarization) focused onto a sample with an aspheric lens (f=1.5 cm). The TH signals in reflection and transmission were spectrally filtered and detected with photomultiplier tubes, such as shown in FIG. 2. Several dielectric films on fused silica have been studied including ternary oxides $H_x Si_{1-x} O_2$ with different composition x. See L. O. Jensen, M. Mende, H. Blaschke, D. Ristau, D. Nguyen, L. Emmert, and W. Rudolph, Proc. SPIE 7843, 784207 (2010). The measurement results are shown in FIG. 3A and the retrieved nonlinear susceptibilities are shown in FIG. 3B. FIG. 3A shows measured TH signal from $Hf_x Si_{1-x} O_2$ films sputtered on fused silica as a function of x. For x=1, the signal in transmission was about 20 times larger than that in reflection, which was also predicted by the model. FIG. 3B shows measured ratio of third-order susceptibility of film and fused silica substrate as a function of the bandgap of the film material. The solid line is from the model discussed herein. The $H_x Si_{1-x} O_2$ films represented half-wave layers at 1064 nm. The latter are summarized in Table 1, which shows measured third-order susceptibilities of dielectric films normalized to that of the fused silica substrate, $|R_{12}|=|X_1^{(3)}/X^{(3)}|$ for $\lambda=1790$ nm. The known $|X_2^{(3)}|$ of fused silica, $2.0\pm0.2\times10^{-22}$ m$^2$/V$^2$, can be used to obtain numerical $X^{(3)}$ values for the films. Because of the short interaction length and moderately short pulses, dispersive effects can be neglected and the model introduced above can be applied.

TABLE 1

| Material | 2d(nm) | n | η | $E_g$ (eV) | $|R_{12}|$ |
|---|---|---|---|---|---|
| $Al_2O_3$ | 100 | 1.76 | 1.83 | 6.2 | 8.2 |
| $Sc_2O_3$ | 206 | 1.97 | 2.22 | 5.7 | 17.8 |
| $HfO_2$ | 267 | 2.09 | 2.30 | 5.6 | 20.9 |
| $Hf_{0.66}Si_{0.34}O_2$ | 293 | 1.86 | 2.00 | 5.9 | 9.5 |
| $Hf_{0.3}Si_{0.7}O_2$ | 326 | 1.64 | 1.72 | 6.3 | 3.2 |
| $Hf_{0.02}Si_{0.98}O_2$ | 354 | 1.52 | 1.53 | 7.5 | 0.7 |
| $SiO_2$ | bulk | 1.45 | 1.50 | 8.3 | 1 |

As the $HfO_2$ content in the samples decreases the contribution from the substrate to the transmitted TH becomes more important, until, for the sample with lowest $HfO_2$ content (1.6%), the detected signal matches to within a few percent the TH generated from the substrate (fused silica) alone, see FIG. 3A. Roughly speaking, the contribution from the substrate to the total TH detected in transmission can be neglected if $(X_1^{(3)}d')/(X_2^{(3)}z_0) \gg 1$, where the products $(X_1^{(3)}d')$ and $(X_2^{(3)}z_0)$ are an approximate measure of the magnitude of the signal generated in the film and substrate, respectively. Here d' is the smaller of the film thickness and the coherence length for forward TH generated in the film.

The contribution of the substrate to the measured TH is considerably reduced when detecting in reflection and can safely be neglected for the ternary oxide films if x≥0.2. In more general terms, the signal from the film dominates if $(X_1^{(3)}z_1)/(X_2^{(3)}z_2) \gg 1$, where the products $(X_1^{(3)}z_1)$ and $(X_2^{(3)}z_2)$ are an approximate measure of the magnitude of the signal generated in the film and substrate, respectively. Here $z_1$ ($z_2$) is the bigger (smaller) of d'$\rho_{12}$ (Rayleigh range) and the coherence length for backward TH generated in the film (substrate). The coherence length for forward (−) and backward (+) TH generated in the film is $d_{coh}^{\mp}=\lambda/6/(n_2\mp\eta_2)$. This condition assumes that forward TH generated in the substrate and reflected at the substrate's back surface does not contribute to the measured signal. To ensure this in an experiment, samples (film on 1-mm substrates) were placed on fused silica blocks, using index matching oil opaque at 266 nm. Any forward TH generated in the substrate that could potentially get reflected at the substrate's back surface is absorbed by the oil. To test this technique, the TH from bare fused silica substrates of varying thickness was measured in reflection and the signal was found to be thickness-independent. This is as expected when assuming that only backward TH is detected.

The data in FIG. 3B is plotted as a function of the bandgap $E_g$ of the film. The solid line represents results from a known simple dispersion model for nonlinear susceptibilities, $$\chi^{(3)} \propto \frac{1}{(E_g^2 - E_3^2 - 2i\hbar E_3\gamma)(E_g^2 - E_1^2 - 2i\hbar E_1\gamma)^3}, \tag{6}$$

where $E_n$=nhv and γ is a phenomenological damping coefficient. Good agreement of model and experiment was obtained for $2i\hbar E_n\gamma \ll E_g^2 - E_n^2$ meaning $1/\gamma > 1$ fs. The latter is reasonable considering the off-resonant character of the interaction with the wide-gap materials ($3h\nu < E_g$).

Figure 4A:
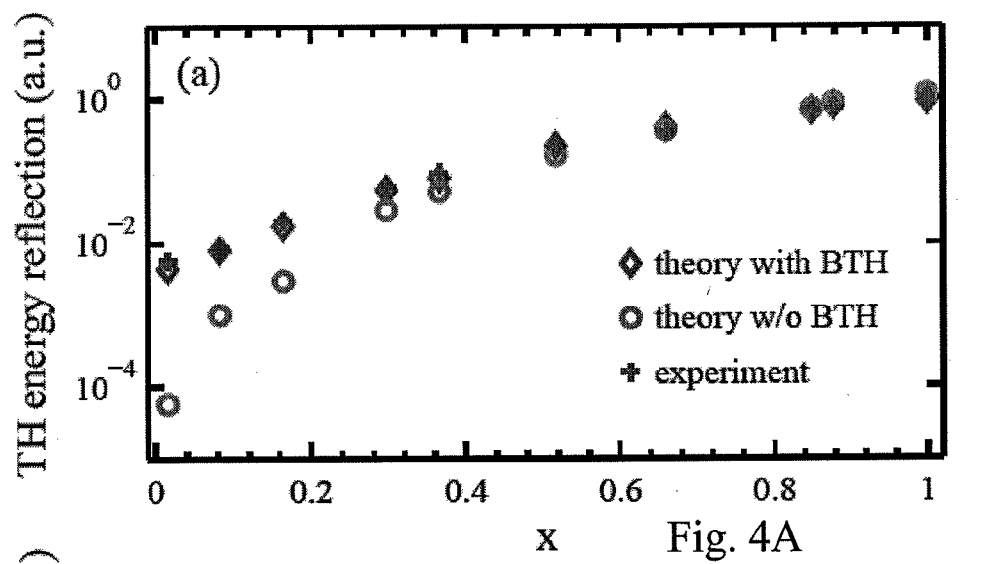
FIG. 4A provides a comparison of measured and calculated third harmonic generation in reflection from $Hf_xSi_{1-x}O_3$ films on fused silica substrates shown as a function of x with and without the backward generated third harmonic taken into account, in accordance with various embodiments.

As a test and to illustrate the effect of various model components, using the values of $|X_1^{(3)}|$ for the $H_x Si_{1-x} O_2$ films obtained from the transmission data, the TH signal in reflection was calculated as a function of x using equation (4) with and without taking into account the backward generated TH in both film and substrate, see FIG. 4A, which provides a comparison of measured and calculated TH generation in reflection from $Hf_x Si_{1-x} O_3$ films on fused silica substrates shown as a function of x with and without the backward generated TH (BTH) taken into account. There is good agreement of model and experimental data only if backward generated TH is considered. A ratio of the TH in reflection was measured from a film with x=0.016 and an uncoated fused silica substrate of about 1.6. This value agrees well with what our model predicts and demonstrates the importance of backward generated TH for detection in reflection geometry.

Figure 4B:
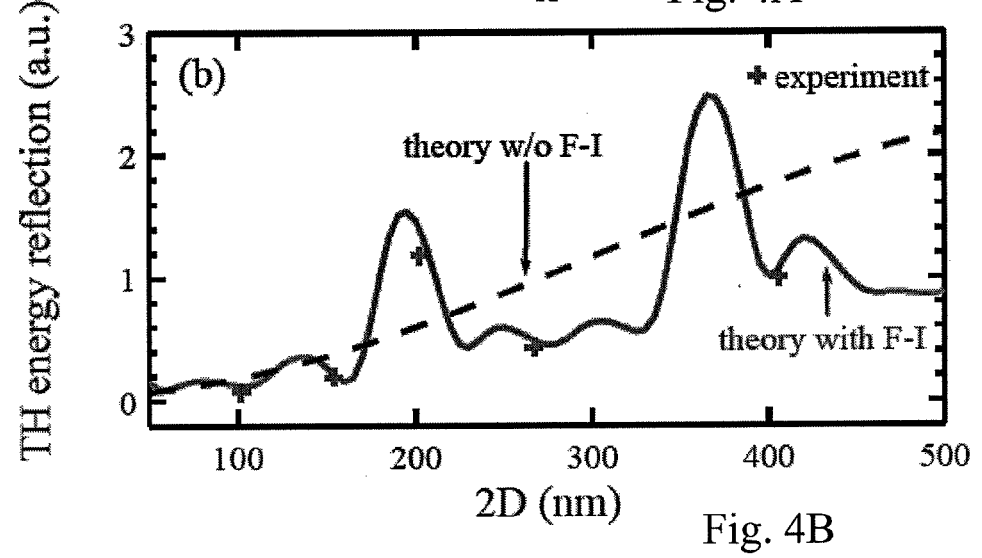
FIG. 4B shows measured third harmonic signal in reflection from $HfO_3$ films on fused silica as a function of film thickness and comparison to the model with and without film interference effects, in accordance with various embodiments.

FIG. 4B shows measured TH signal in reflection from HfO$_3$ films on fused silica as a function of film thickness and comparison to the model with and without film interference (F-I) effects. The calculated TH is normalized to minimize the mean square deviation with respect to the experimental data. The model results use the $X^{(3)}$ value from FIG. 3B. Obviously the correct account of interference is necessary to reproduce the measurements. If this is done, the same $X^{(3)}$ values (normalized to the value for the fused silica substrate) are obtained from transmission and reflection data.

Above, TH generation from thin films in transmission and reflection was analyzed. A theoretical model was applied that takes into account interference effects of fundamental and third harmonic waves in the film, the backward generated TH, and the pump beam profile (focusing) to determine third-order nonlinear susceptibilities, $X^{(3)}$, of several oxide films from measurements. The bandgap dependence of $X^{(3)}$ of these dielectric films agrees with predictions from a simple nonlinear oscillator model. Simple relations were derived to determine when the TH from the film dominates that from the substrate, where the simple relations involve key parameters such as the nonlinear susceptibilities of film and substrate, the film thickness, the coherence length for forward and backward TH, the Rayleigh range of the incident beam in the substrate, and the reflection coefficient at the film-substrate interface. TH in reflection can considerably reduce the signal from the substrate compared to TH in transmission.

In the following, modeling third harmonic generation from a stack of films using nonlinear optical matrices is discussed, which modeling was used in the discussion above regarding characterization of third harmonic generation in thin films. A matrix approach is formulated for third harmonic generation in stacked materials, for example thin films, in the limit of small signal conversion. The approach takes into account interference of fundamental and nonlinear fields, the nonlinear signal generation in forward and backward direction and the coupling of co- and counter-propagating waves. Explicit matrix expressions for the transmitted and reflected nonlinear signals are derived. A plane monochromatic wave incident normally on the stack of layers is considered first and later the approach is generalized to focused beams with cylindrically symmetric spatial profiles. The geometry is sketched in FIG. 1.

Figure 5:
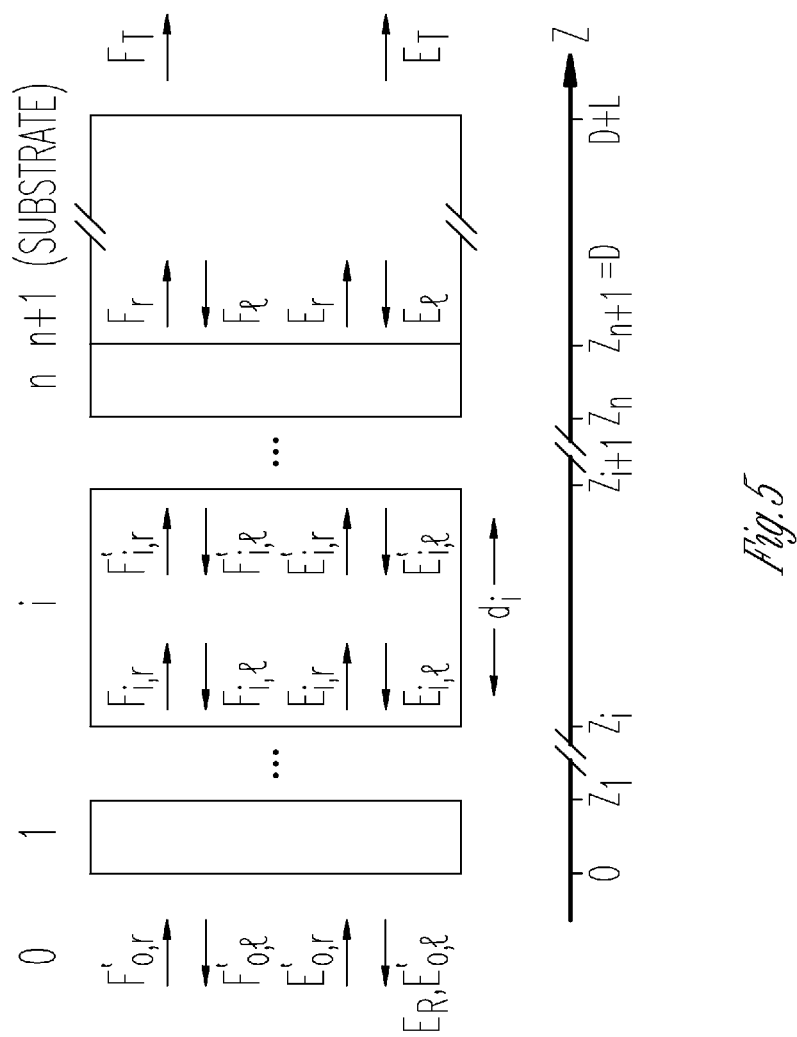
FIG. 5 is a schematic representation of third harmonic generation in a stack of layers on a semi-infinite substrate, in accordance with various embodiments.

FIG. 5 is a schematic representation of TH generation in a stack of layers on a semi-infinite substrate. TH and fundamental fields are labeled E and F, respectively. Fields propagating to the right (r) and left (l) are distinguished in each layer. Fields on the right interfaces are labeled with a prime. Each layer i of a total of n layers, i=1 . . . n, has a thickness $d_i$ along the z axis with boundary layer interfaces at $z_i$ and $z_{i+1}$. The total thickness of the stack of layers along the z direction is D with the thickness of the substrate being L along the z direction.

In an embodiment, a first step can be to calculate the fundamental fields in each layer (index i) propagating to the right and left. This can be accomplished using the well-known matrix formalism, connecting the input vector $\vec{v}'=(F'_{0,r}, F'_{0,l})$ to vectors of the type $\vec{v}_i=(F_{i,r}, F_{i,l})$ within the stack.

The overall transfer matrix M of a stack of n layers (from 0 to n+1) is obtained from an ordered product of 2×2 matrices.

$$M = H_{n+1,n} L_n H_{n,n-1} \cdots H_{2,1} L_1 H_{1,0}, \quad (7)$$

where $$H_{i,j} = \frac{1}{t_{ij}} \begin{pmatrix} 1 & r_{ij} \\ r_{ij} & 1 \end{pmatrix} \text{ and } L = \begin{pmatrix} e^{-i\kappa_i d_i} & 0 \\ 0 & e^{+i\kappa_i d_i} \end{pmatrix} \quad (8)$$

are the interface transition matrix and the matrix describing propagation in layer i, respectively. Here $r_{ij}$, $t_{ij}$, $\kappa_i$ and $d_i$ are the amplitude reflection coefficient and transmission coefficient of the interface between layers i and j, the wave vector, and the layer thickness, respectively.

Using this system matrix, the output vector in the substrate just after the last layer can be related to the input vector just before the first interface, $$\vec{v}_{n+1} = \begin{pmatrix} F_r \\ F_l \end{pmatrix} = \begin{pmatrix} M_{11} & M_{12} \\ M_{21} & M_{22} \end{pmatrix} \begin{pmatrix} F'_{0,r} \\ F'_{0,l} \end{pmatrix}, \quad (9)$$

where $M_{ij}$ are the elements of matrix M. Neglecting reflections at the back surface of the substrate, $F_l=0$, $F'_{0,l}$ can be obtained by $$F'_{0,l} = -\frac{M_{21}}{M_{22}} F'_{0,r} \quad (10)$$

The fundamental field amplitude at the left-hand edge in an arbitrary layer i of the stack can be written as $$\vec{v}_i = \begin{pmatrix} F_{i,r} \\ F_{i,l} \end{pmatrix} = H_{i,i-1} L_{i-1} \ldots H_{2,1} L_1 H_{1,0} \begin{pmatrix} F'_{0,r} \\ F'_{0,l} \end{pmatrix}, \quad (11)$$

with $F'_{0,r}$ given by the initial conditions and $F'_{0,l}$ given by equation (10).

A somewhat modified approach can be formulated to express the input vector of the TH field $\vec{w}'_0=(E'_{0,r}, E'_{0,l})$ in terms of the output vector $\vec{w}'_{n+1}=(E_r, E_l)$ in the substrate. The overall transfer matrix M for the stack, $$M = H_{n+1,n} L_n H_{n,n-1} \cdots H_{2,1} L_1 H_{1,0}, \quad (12)$$

is defined in terms of transition and layer matrices analogous to equation (8) now using the corresponding reflection, transmission, and propagation coefficients for the TH field $\rho_{ij}$, $\tau_{ij}$ and $\kappa_i$, respectively, $$H_{i,j} = \frac{1}{\tau_{i,j}} \begin{pmatrix} 1 & \rho_{ij} \\ \rho_{ij} & 1 \end{pmatrix} \text{ and } L_i = \begin{pmatrix} e^{-i\kappa_i d_i} & 0 \\ 0 & e^{+i\kappa_i d_i} \end{pmatrix}. \quad (13)$$

In the limit of low signal conversion, depletion of the pump can be neglected. The TH field at the left-edge of the layer with index i is related to the field on the right-edge through $$E'_{i,r} = E_{i,r} e^{-i\kappa_i d_i} + \Delta E_{i,r}, \quad (14)$$

where $\Delta E_{i,r}$ is the TH field produced in layer i propagating to the right. A similar relationship applies to the left-propagating fields. The terms $\Delta E_{i,r}$ and $\Delta E_{i,l}$ can be calculated later.

Using the propagation matrix for layer i, the field components can be written as $$\begin{pmatrix} E'_{i,r} \\ E'_{i,l} \end{pmatrix} = \begin{pmatrix} L_{11} & L_{12} \\ L_{21} & L_{22} \end{pmatrix}_i \begin{pmatrix} E_{i,l} \\ E_{i,r} \end{pmatrix} + \vec{\Delta}_i, \quad (15)$$

where the last term describes a vector with components of the TH field generated in this layer $\vec{\Delta}_i=(\Delta E_{i,r},-\Delta E_{i,l}e^{i\kappa_i d_i})$.

Repeating this procedure starting from the incident field yields for the field in the final medium $$\vec{w}_{n+1} = H_{n+1,n}L_n H_{n,n-1}\cdots L_1 H_{1,0}\vec{w}'_0 +$$
$$H_{n+1,n}L_n H_{n,n-1}\cdots L_2 H_{2,1}\vec{\Delta}_1 +$$
$$H_{n+1,n}L_n H_{n,n-1}\cdots L_3 H_{3,2}\vec{\Delta}_2 \vdots + H_{n+1,n}\vec{\Delta}_n, \quad (16)$$

or in more compact form $$\vec{w}_{n+1} = M\vec{w}'_0 + H_{n+1,n}\sum_{i=1}^{n}\left(\prod_{j=n}^{i+1}L_j H_{j,j-1}\right)\vec{\Delta}_i. \quad (17)$$

Note that the index of the productory function $j=n, n-1 \ldots i+2, i+1$ is in decreasing order. Equation (17) represents a system of two linear equations for the unknown field components $E_r$ and $E'_{0,l}$ with $E'_{0,r}$ and $E_l$ being given. Here it is assumed that $E'_{0,r}=0$ (no input TH field) and $E_l=0$. The latter field will be accounted for later and represents the TH field generated in backward direction by the fundamental field propagating in the forward direction in the substrate. Under these conditions the unknown TH fields can be written as a sum of contributions from the individual layers, $$\begin{pmatrix} E_r \\ E'_{0,l} \end{pmatrix} = \frac{H_{01}L_1^{-1}}{M_{11}^{-1}}\begin{pmatrix} 1 & 0 \\ M_{21}^{-1} & -M_{11}^{-1} \end{pmatrix}[\vec{\Delta}_1 + \quad (18)$$
$$H_{1,2}L_2^{-1}\vec{\Delta}_2 + \ldots + H_{1,2}L_2^{-1}\ldots H_{n-1,n}L_n^{-1}\vec{\Delta}_n],$$

where $M^{-1}$ is the inverse of matrix M, cf. equation (12), representing the overall transfer matrix from layer n+1 to layer 0 at the TH frequency. The result given by equation (18) can be compared to that found in D. S. Bethune, J. Opt. Soc. Am. B 6, 910 (1989), assuming normal incidence. Although a rather different line of thought is followed above to solve the problem, both approaches yield the same result.

To derive $\vec{\Delta}_i$ from the known fundamental field $\vec{v}_i$, cf. equation (11), TH generation can be analyzed. At each position z in the layer, a fundamental field F propagating for example in the +z direction generates a third order nonlinear polarization, proportional to the total fundamental field cubed, which acts as the source of new field components oscillating at the TH frequency, propagating in both forward and backward directions. The generating paraxial wave equation for the TH field traveling in the +z direction in layer i, $\Delta E_{i,r}=\Delta_{i,r}e^{-i\kappa_i(z-z_i)}$, is given by $$2i\kappa_i\frac{d\Delta_{i,r}}{dz}e^{-i\kappa_i(z-z_i)} = \frac{9w^2\chi_i^{(3)}}{c^2}[F_{i,r}e^{-i\kappa_i(z-z_i)}+F_{i,l}e^{i\kappa_i(z-z_i)}]^3, \quad (19)$$

where some basic approximations have be made, such as the small conversion approximation, the slowly varying amplitude approximation, and the infinite plane-wave approximation. Solving equation (19) yields the TH field produced in layer i, propagating to the right, $$\Delta E_{i,r} = -\frac{9iw^2\chi_i^{(3)}d_i e^{-i\kappa_i d_i}}{2\kappa_i c^2} \times \quad (20)$$
$$\{F_{i,r}^3 e^{-i\Delta\kappa_i^- d_i/2}\text{sinc}(\Delta k_i^- d_i/2) + F_{i,l}^3 e^{+i\Delta\kappa_i^+ d_i/2}\text{sinc}(\Delta k_i^+ d_i/2) + F_{i,r}^2 F_{i,l}$$
$$e^{-i\Delta\phi_i^- d_i/2}\text{sinc}(\Delta\phi_i^- d_i/2) + F_{i,r}F_{i,l}^2 e^{-i\Delta\phi_i^+ d_i/2}\text{sinc}(\Delta\phi_i^+ d_i/2)\},$$

where $\Delta\kappa_i^\mp=3\kappa_i(\Delta\varphi_i^\mp=\kappa_i\mp\kappa_i)$ is the wave vector mismatch for the forward (−) and backward (+) generated TH resulting from the mixing of co- (counter-) propagating fundamental fields in layer i. Here $F_{i,r}$ and $F_{i,l}$ are given by equation (11).

Following a similar procedure yields the TH field produced in layer i, propagating to the left, $$\Delta E_{i,l} = -\frac{9iw^2\chi_i^{(3)}d_i}{2\kappa_i c^2} \times \quad (21)$$
$$\{F_{i,r}^3 e^{-i\Delta\kappa_i^+ d_i/2}\text{sinc}(\Delta k_i^+ d_i/2) + F_{i,l}^3 e^{+i\Delta\kappa_i^- d_i/2}\text{sinc}(\Delta k_i^- d_i/2) + F_{i,r}^2 F_{i,l}$$
$$e^{-i\Delta\phi_i^+ d_i/2}\text{sinc}(\Delta\phi_i^+ d_i/2) + F_{i,r}F_{i,l}^2 e^{-i\Delta\phi_i^- d_i/2}\text{sinc}(\Delta\phi_i^- d_i/2)\}.$$

These results can be generalized to include the contribution from the substrate to the total TH detected in both transmission and reflection geometries, allowing for the use of fields with Gaussian spatial profiles and accounting for the k-vector spectrum of focused laser beams. The approach followed involves performing a Hankel decomposition of the driving polarization inside the substrate into plane wave components by means of a Hankel transformation, HT, and calculating the generated TH field arising from each of these components.

The total thickness of the stack is assumed to be $D \ll z_0$ much smaller than the Rayleigh range, and a substrate of thickness $L \gg z_0$. Because of this geometry, the contribution of the field reflected at the output face of the substrate to $E_R$ can be neglected.

The TH field $E_T$ in the spatial frequency ($\rho$) domain is the sum of the field produced in the film, $E_r$, multiplied by the spatial frequency spectrum and the Fresnel propagator, and the field produced in the substrate:

$$E_T(\rho) = \tau_{n+1,0}\left[\frac{\pi w_0^2}{3}e^{-\pi^2 w_0^2 \rho^2/3}e^{ia\rho^2 L}E_r - \quad (22)\right.$$
$$\left. b\int_0^L dz P_{n+1}(\rho,z)e^{-i\Delta\kappa_{n+1}^- z}e^{ia\rho^2(L-z)}\right],$$

where $a=2\pi^2/\kappa_{n+1}$, $$b = \frac{9iw^2}{2c^2\kappa_{n+1}}\chi_{n+1}^{(3)},$$

$\Delta\kappa_{n+1}^-=3\downarrow_{n+1}-\kappa_{n+1}$ is the wave-vector mismatch of co-propagating fundamental and TH waves in the substrate, and $P_{n+1}(\rho, z)=\text{HT}\{F^3(r, z)\}$ is the Hankel transform of the nonlinear polarization in the substrate. Since $D \ll z_0$, the $\rho$ dependence of the phase of fundamental and harmonic fields introduced by the film may be neglected. The latter implies that, for each spatial frequency component $\rho$, the thin film response is that for a plane wave incident normally.

The fundamental field after the stack of films subject to Fresnel diffraction is $F(\rho,z)=F_r\pi w_0^2 e^{-\pi^2 w_0^2 \rho^2}e^{ia\rho^2(z-D)}$.

A similar procedure can be used to obtain the total TH field $E_R$ propagating to the left. Again, because of $D \ll z_0$, for each spatial frequency component, the nonlinear film response is that for a normally incident plane wave. The field $E_R(\rho)$ is the sum of the TH produced in the stack of films and the backward generated TH in the substrate, and transmitted through the film:

$$E_R(\rho) = \frac{\pi w_0^2}{3}e^{-\pi^2 w_0^2 \rho^2/3}E'_{0,l} + \quad (23)$$
$$T_{n+1,0}\prod_{j=1}^{n}e^{-2i\kappa_j d_j} \times b\int_0^L dz P_{n+1}(\rho,z)e^{-i\Delta\kappa_{n+1}^+ z}e^{ia\rho^2(D-z)},$$

where $\Delta\kappa_{n+1}^+=3\kappa_{n+1}+\kappa_{n+1}$ is the wave-vector mismatch between the fundamental and TH waves for the backward generated TH in the substrate. $T_{n+1,0}$ is the overall transmission amplitude at the TH frequency, from layer n+1 (substrate) to layer 0, $$T_{n+1,0} = M_{22}^{-1} - \frac{M_{12}^{-1} M_{21}^{-1}}{M_{11}^{-1}}. \quad (24)$$

In order to test the model, the TH signal in transmission and reflection produced by several samples consisting of single layer films and stacks of films deposited into fused silica substrates were experimentally measured. Table 2 shows the thin film samples used in TH measurements in transmission and reflection, where s refers to the substrate. As discussed above with respect to the characterization discussion, the measurements were performed with the pulse train from a titanium:sapphire laser oscillator (790 nm, 50 fs, 113 MHz, linear polarization) focused onto the sample with an aspheric lens (f=1:5 cm). The TH signals in reflection and transmission were spectrally filtered and detected with photomultiplier tubes. The measurement results are shown in FIGS. 6A and 6B.

TABLE 2

| Sample # | Configuration | Thickness (nm) |
|---|---|---|
| 1 | s/HfO$_2$ | s/102 |
| 2 | s/HfO$_2$ | s/154 |
| 3 | s/HfO$_2$ | s/202 |
| 4 | s/HfO$_2$ | s/405 |
| 5 | s/HfO$_2$/SiO$_2$ | s/176/164 |
| 6 | s/HfO$_2$/SiO$_2$/HfO$_2$/SiO$_2$ | s/265/95/180/164 |
| 7 | s/HfO$_2$/SiO$_2$/HfO$_2$/SiO$_2$ | s/281/67/173/155 |
| 8 | s/(HfO$_2$/SiO$_2$)$^8$HfO$_2$ | s/(100/138)$^8$100 |

Figure 6A:
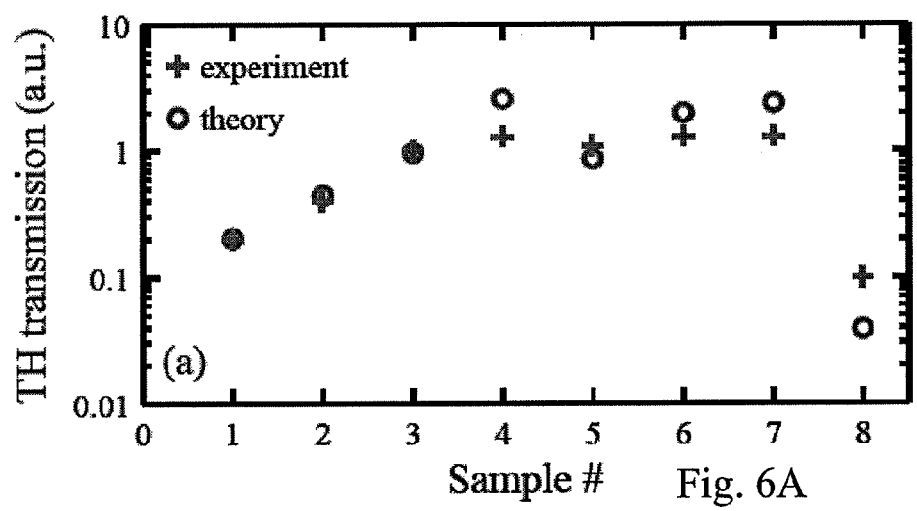
FIGS. 6A and 6B show model predictions based on equations for the third harmonic in transmission and reflection, respectively, in accordance with various embodiments.
Figure 6B:
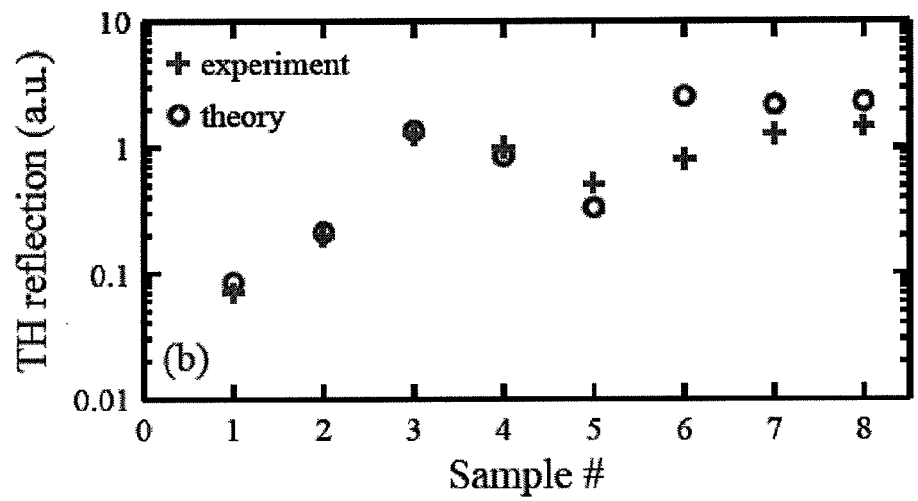

FIGS. 6A and 6B also shows the model predictions based on equations (22) and (23) for the TH in transmission and reflection, respectively. Measured TH signal are shown as crosses and calculated TH signals are shown as circles in transmission in FIG. 6A and in reflection in FIG. 6B from the various samples, cf. Table 2. The known value for the nonlinear susceptibility of fused silica, $X^{(3)}=2\times10^{-22}$ m$^2$/V$^2$, was used. For hafnia, the estimated value of $X^{(3)}=4\times10^{-21}$ m$^2$/V$^2$ was used. Good agreement was found between experiment and model predictions. The discrepancies can be explained from the uncertainty in layer thickness and index of refraction (~5%).

A practical application of the model presented here is in the design of samples consisting of stacks of films optimized with respect to the TH conversion efficiency. It is well known that a limiting factor in the efficiency of any nonlinear optical process comes from the phase mismatch between the different frequency components of the interacting waves, resulting from material dispersion, which prevents the constructive addition of the nonlinear fields. The incident and nonlinear fields accumulate a relative phase of $\pi$ over a distance known as the coherence length $L_{coh}=\pi/\Delta\kappa^-$. The nonlinear signal will thus oscillate sinusoidally with propagation distance with a period equal to twice the coherence length. A wide range of techniques have been developed over the last decades to compensate for this unavoidable phase mismatch, allowing the generated signal to accumulate constructively over an extended propagation distance (>$L_{coh}$) and hence increase the efficiency of the nonlinear process.

To illustrate this point, a sample consisting of 9 alternating layers of hafnia and silica was designed. The total hafnia thickness was kept constant, equal to one coherence length, $D=L_{coh}=627$ nm, and a genetic algorithm was employed to find the individual layer thicknesses that maximize the reflected TH signal, obtaining substrate/[HfO$_2$/SiO$_2$]$^4$HfO$_2$=substrate/97/118/97/121/96/426/115/321/222 nm. The optimized sample yields a reflected TH signal that is approximately 900 times larger than the expected TH from a single hafnia film of thickness $L_{coh}$ and approximately 200 times larger than the expected TH from a single hafnia film of thickness $L_{coh}$ assuming perfect phase-matching ($\Delta\kappa^-=0$). Assuming an input sequence of 0.1 J/cm$^2$, which is approximately equal to 5 times below the damage fluence of hafnia for a pulse duration of 50 fs, a conversion efficiency into the TH of 1% was predicted. In order to improve the conversion efficiency, the optimization algorithm was performed under the same conditions as before, but forcing an 80% reflection of the fundamental and TH fields at the substrate interface, which could be practically implemented by adding a thin layer of a metal such as aluminum or gold. Doing this improves the conversion efficiency to 30%. If it is assumed that the uncertainty in the optical path length of the layers is approximately equal to 2%, the uncertainty in the TH conversion efficiency of our optimized sample is on the order of approximately equal to 30%.

Table 3 provides a set of references values. These references values are for silica and hafnia. Silica and hafnia are used in various examples discussed herein. Coherence lengths for silica and hafnia are provided in Table 3.

TABLE 3

| | Coherence lengths | |
|---|---|---|
| λ/4 silica ω (nm) | 135.36 | $\pi/\Delta k^- = 2746.1$ nm |
| λ/4 silica 3ω (nm) | 44.30 | $\pi/\Delta k^+ = 44.39$ nm |
| λ/2 silica ω (nm) | 270.73 | $\pi/\Delta\varphi^- = 129$ nm |
| λ/2 silica 3ω (nm) | 88.59 | $\pi/\Delta\varphi^+ = 66.05$ nm |
| λ/4 hafnia ω (nm) | 103.83 | $\pi/\Delta k^- = 626.9$ nm |
| λ/4 hafnia 3ω (nm) | 31.60 | $\pi/\Delta k^+ = 32.79$ nm |
| λ/2 hafnia ω (nm) | 207.65 | $\pi/\Delta\varphi^- = 89.07$ nm |
| λ/2 hafnia 3ω (nm) | 63.20 | $\pi/\Delta\varphi^+ = 47.94$ nm |

FIG. 7A is a schematic of one layer of hafnia on a substrate with respect to TH in transmission. The layer of hafnia has a thickness D. FIG. 7B are plots of TH versus thickness D for the one layer of hafnia configuration of FIG. 7A. Curve 742 assumes $\Delta k=0$ and no Fabry-Perot effects. Curve 744 includes $\Delta k=0$ with no Fabry-Perot. Curve 746 includes Fabry-Perot effects and includes nonzero $\Delta k$. Curve 748 includes Fabry-Perot effect and nonzero.

FIG. 8A is a schematic of one layer of hafnia on a substrate with respect to TH in reflection. The layer of hafnia has a thickness D. FIG. 8B are plots of TH versus thickness D for the one layer of hafnia configuration of FIG. 8A. Curve 842 assumes $\Delta k=0$ and no Fabry-Perot effects. Curve 844 includes $\Delta k=0$ with no Fabry-Perot. Curve 846 includes Fabry-Perot effects and includes nonzero $\Delta k$. Curve 848 includes Fabry-Perot effect and nonzero.

Figure 9:
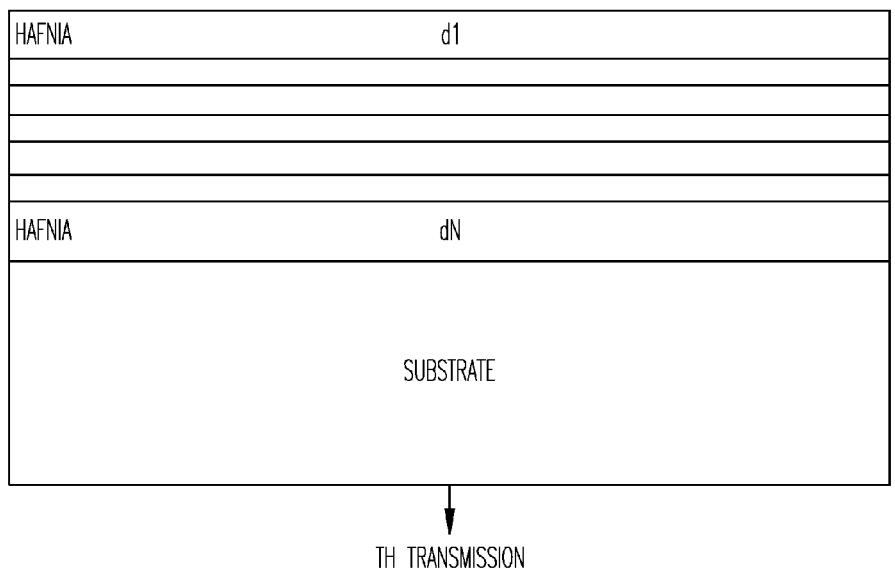
FIG. 9 is an example configuration of N layers of hafnia and silica in a stack on a substrate for third harmonic transmission, in accordance with various embodiments.

FIG. 9 is an example configuration 901 of N layers of hafnia and silica in a stack on a substrate for TH transmission. The layers alternate with a hafnia layer being the N$^{th}$ layer, having thickness $d_N$, on and contacting the substrate and another hafnia layer being configured as the first layer of the stack, having thickness $d_1$ and disposed in the stack furthest from the substrate. With this alternating structure, there is one more hafnia layer in the stack than silica layer, and the hafnia layers are odd numbered layers and silica layers are even number of layers. The coherence lengths are silica: $\pi/\Delta k^- = 2746.1$ nm and hafnia: $\pi/\Delta k^- = 626.9$ nm. The total hafnia thickness is at the coherence length ($L_{coh}$) and is fixed to D=627 nm. For the configuration of FIG. 9, the optimized transmitted TH as a function of the number of silica layers in the stack was considered. The total thickness of hafnia was kept constant at $L_{coh}$, while the position and thickness of individual silica layers were open parameters. Several cases were considered. Case 1 considered no Fabry-Perot (FP) effects with $X^{(3)}_{silica}=0$. Case 2 considered no FP effects with $X^{(3)}_{silica}=2e-22$ m²/V². Case 3 considered including FP effects with $X^{(3)}_{silica}=0$. Case 4 considered including Fabry-Perot (FP) effects with $X^{(3)}_{silica}=2e-22$ m²/V².

Figure 10A:
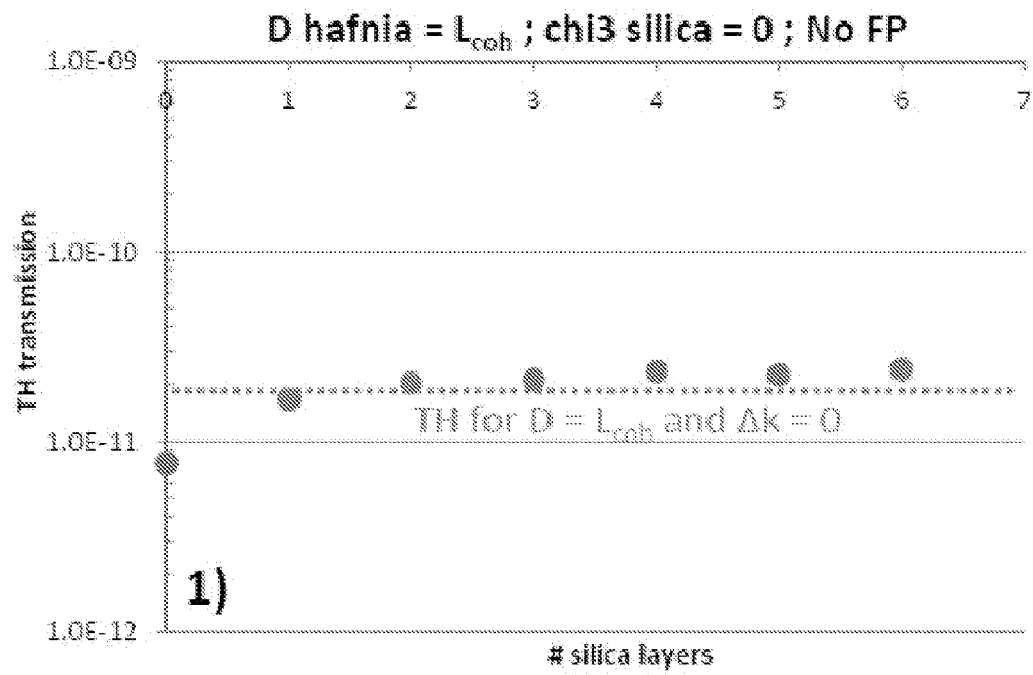
FIGS. 10A-10D are plots of optimized transmitted third harmonic as a function of the number of silica layers in the stack, in accordance with various embodiments.
Figure 10B:
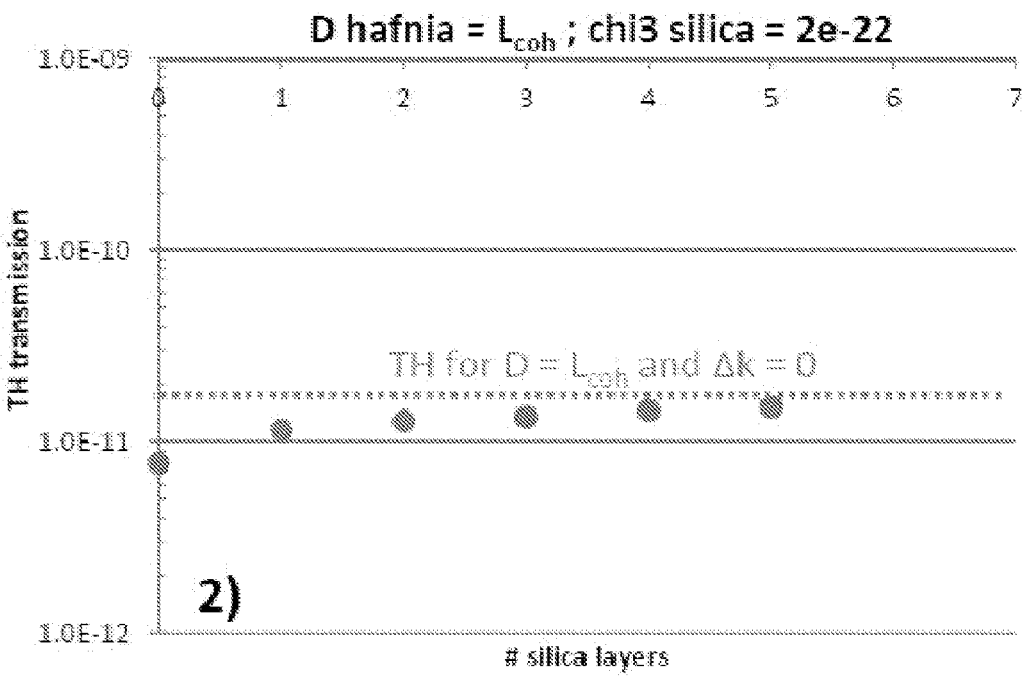
Figure 10C:
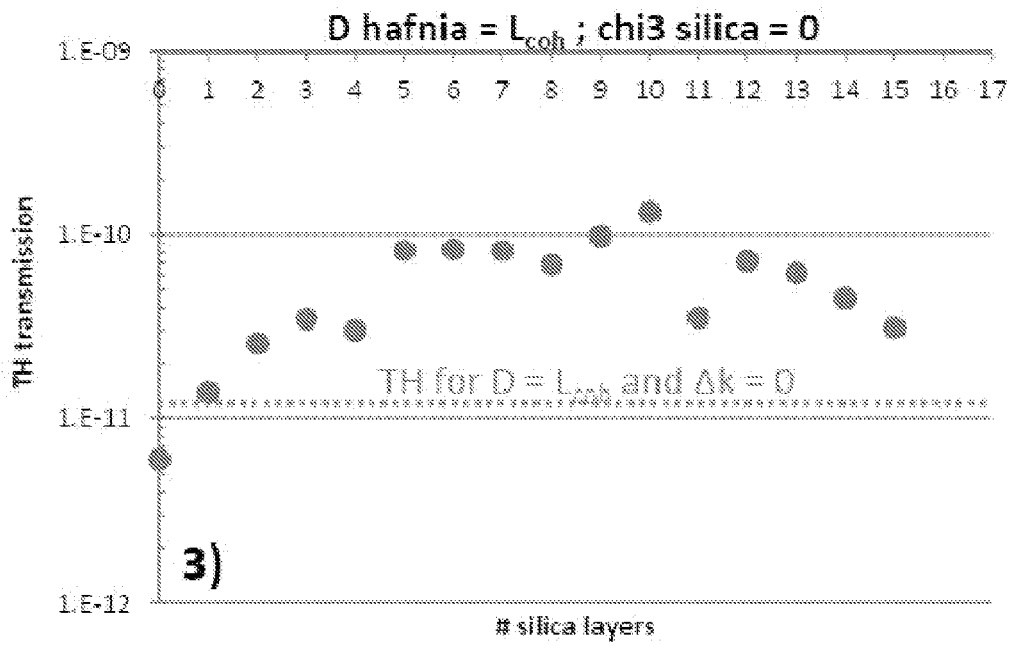
Figure 10D:
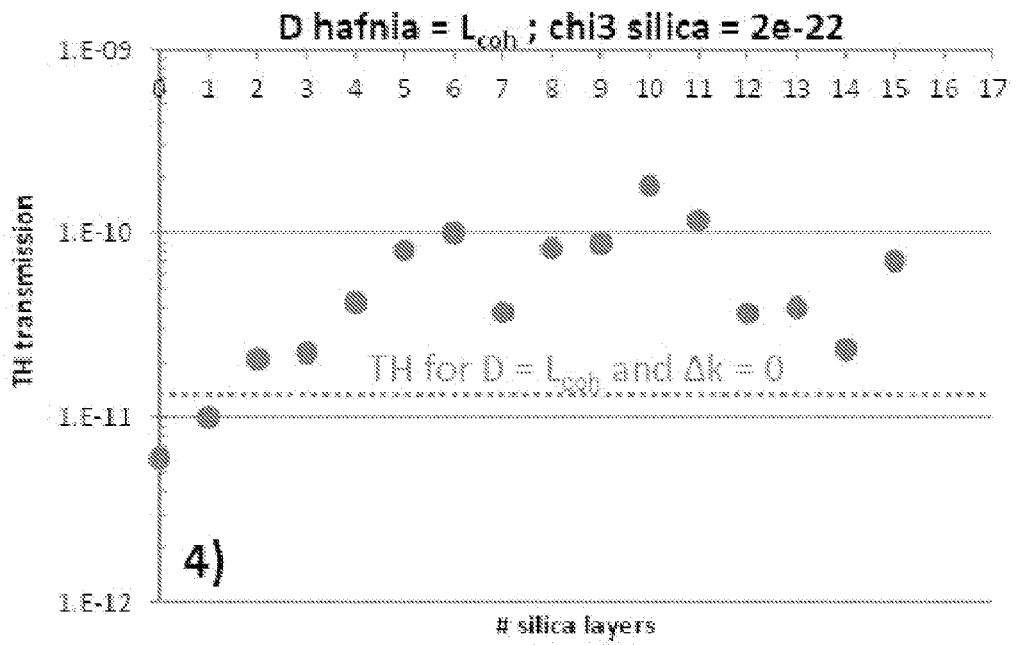

FIGS. 10A-10D are plots of the optimized transmitted TH as a function of the number of silica layers in the stack. FIG. 10A are the results of case 1. FIG. 10B are the results of case 2. FIG. 10C are the results of case 3. FIG. 10D are the results of case 4. The horizontal dotted line in each of the plots of FIGS. 10A-10D indicate TH for a single hafnia film for $D=L_{coh}$ and $\Delta k=0$.

Tables 4-7 show thickness in nanometers of the alternating layers for the number of silica layers ranging from 0 to 3. In the alternating structure, with k layers of silica, there is 2k+1 total number of layers in the stack. Note, for silica, the following sums: $L_{coh}+L_{coh}/2=4119$ nm and $L_{coh}+2L_{coh}/3=4576$ nm. Table 4 lists results for case 1, Table 5 lists results for case 2, Table 6 lists results for case 3, and Table 4 lists results for case 4.

TABLE 4

| # silica | d1 | d2 | d3 | d4 | d5 | d6 | d7 | D silica |
|---|---|---|---|---|---|---|---|---|
| 0 | 626.9 | | | | | | | 0 |
| 1 | 307.6 | 4119.1 | 319.3 | | | | | 4119 |
| 2 | 198.5 | 4542.9 | 197.8 | 4644.2 | 230.7 | | | 9187 |
| 3 | 161.7 | 4600.3 | 161.3 | 4612.9 | 150.2 | 1.0 | 153.7 | 9214 |

TABLE 5

| # silica | d1 | d2 | d3 | d4 | d5 | d6 | d7 | D silica |
|---|---|---|---|---|---|---|---|---|
| 0 | 626.9 | | | | | | | 0 |
| 1 | 309.7 | 4523.6 | 317.2 | | | | | 4524 |
| 2 | 259.5 | 4917.3 | 124.2 | 4981.0 | 243.2 | | | 9898 |
| 3 | 135.5 | 140.1 | 176.7 | 4526.3 | 150.1 | 0.3 | 164.6 | 4667 |

TABLE 6

| # silica | d1 | d2 | d3 | d4 | d5 | d6 | d7 | D silica |
|---|---|---|---|---|---|---|---|---|
| 0 | 626.9 | | | | | | | 0 |
| 1 | 394.2 | 4280.9 | 232.7 | | | | | 4281 |
| 2 | 212.4 | 4713.0 | 140.7 | 4718.2 | 273.8 | | | 9431 |
| 3 | 420.4 | 144.5 | 66.1 | 170.7 | 59.7 | 461.1 | 80.7 | 242 |

TABLE 7

| # silica | d1 | d2 | d3 | d4 | d5 | d6 | d7 | D silica |
|---|---|---|---|---|---|---|---|---|
| 0 | 626.9 | | | | | | | 0 |
| 1 | 391.9 | 4542.6 | 235.0 | | | | | 4543 |
| 2 | 439.6 | 4994.1 | 94.4 | 4976.5 | 92.9 | | | 9971 |
| 3 | 394.3 | 176.7 | 55.2 | 169.5 | 113.5 | 146.8 | 64.0 | 493 |

When one silica layer is introduced, the results from all 4 cases are roughly equal: the hafnia layers are approximately $L_{coh}/2$ thick, and the silica layer in between has a thickness such that phase reversal occurs at approximately $3L_{coh}/2$. For cases 2 and 4 and when $X^{(3)}_{silica}$ is turned on, the optimized TH is smaller.

When two silica layers are introduced, cases 1, 2, and 3 give the same results: the hafnia layers are approximately $L_{coh}/3$ thick, and the silica layers in between have a thickness such that phase reversal occurs at approximately $5L_{coh}/3$.

For greater than two silica layers cases 1 and 2 don't improve anymore (results for 1-2 silica layers are reproduced). When FP effects are turned on and for greater than 2 silica layers, the search space of the algorithm becomes larger and it is possible to find results with the same TH but with different combinations of layer thickness. It is much harder to see a trend. In some cases, the silica layers are kept below a couple hundred nm, in others they reach a couple μm.

When FP effects are turned on, the transmitted TH vs. hafnia thickness for the single layer shows a slower modulation, due to hafnia's $\Delta k$, and a faster modulation, due to film effects. When one to two silica layers are introduced, mainly the slower modulation is compensated for. When several silica layers are introduced, not only the slower modulation is being compensated but it is also possible to start compensating for the faster modulation, which is why the algorithm finds solutions with some of the silica layers being a few hundred nm thick.

Figure 11:
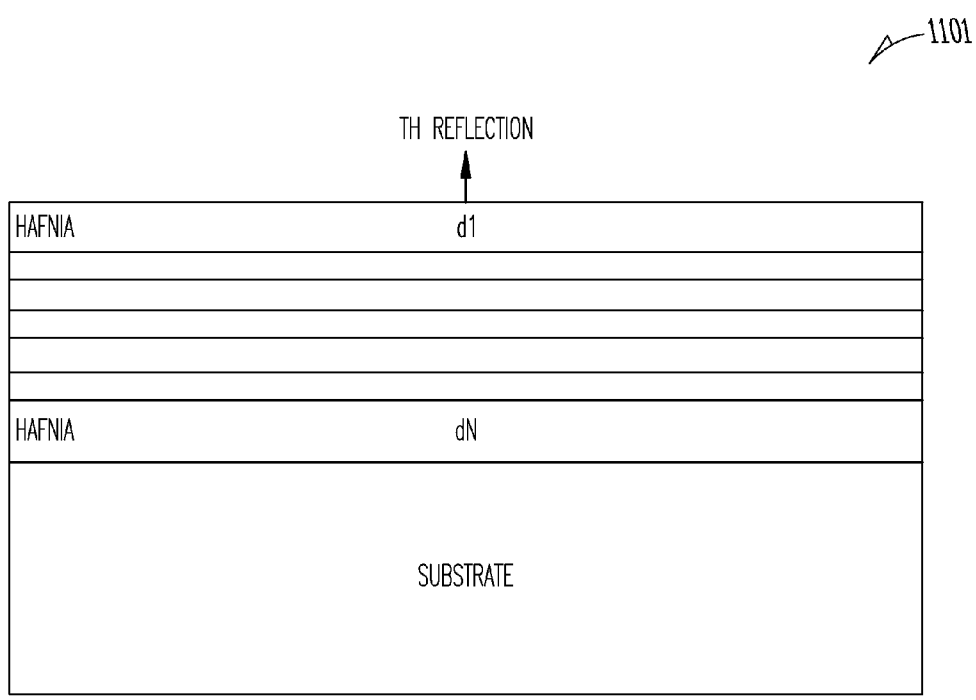
FIG. 11 is an example configuration of N layers of hafnia and silica in a stack on a substrate for third harmonic reflection, in accordance with various embodiments.

FIG. 11 is an example configuration 1101 of N layers of hafnia and silica in a stack on a substrate for TH reflection. The layers alternate with a hafnia layer being the $N^{th}$ layer, having thickness $d_N$, on and contacting the substrate and another hafnia layer being configured as the first layer of the stack, having thickness $d_1$ and disposed in the stack furthest from the substrate. With this alternating structure, there is one more hafnia layer in the stack than silica layer, and the hafnia layers are odd numbered layers and silica layers are even number of layers. The total hafnia thickness is D=627 nm. A structure for a stack to convert an input optical signal is not limited to hafnia and silica structured as discussed above.

For the configuration of FIG. 11, layer thicknesses can be determined by optimizing reflected TH. At this point in a procedure, a pulse spectrum is not included. Table 8 shows results in the layer thickness in nanometers for a 9 layer stack of alternating hafnia and silica, beginning and ending with hafnia. The thickness obtained can be used in considering a pulse spectrum.

TABLE 8

| | |
|---|---|
| d1 | 221.9 |
| d2 | 320.8 |
| d3 | 115.3 |
| d4 | 426.1 |
| d5 | 95.7 |
| d6 | 120.8 |
| d7 | 96.9 |
| d8 | 118.4 |
| d9 | 97.1 |
| D hafnia | 627 |
| D silica | 986 |
| Total D | 1613 |

Table 9 lists laser parameters for the 9 layer structure of Table 8.

TABLE 9

| | |
|---|---|
| Number of silica layers | 4 |
| Conversion efficiency (%) | 1.1 |
| $W_0$ (microns) | 1.48 |
| λ (nm) | 787 |
| t fwhm (fs) | 50 |
| Fluence (J/cm2) | 0.1 |

Figure 12A:
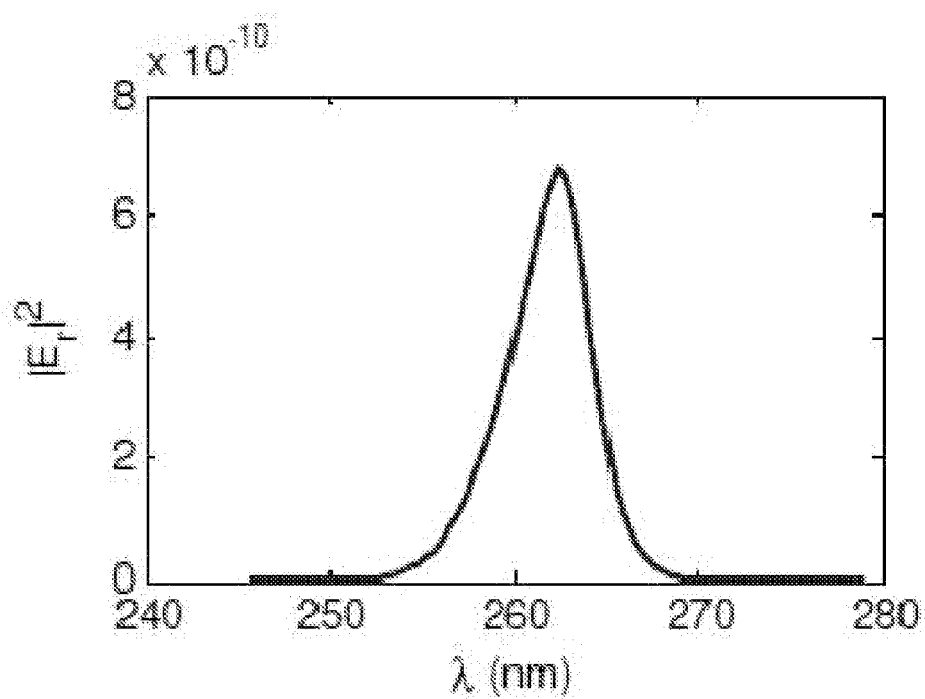
FIG. 12A shows a plot of reflected electric field squared versus wavelength for a structure, in accordance with various embodiments.
Figure 12B:
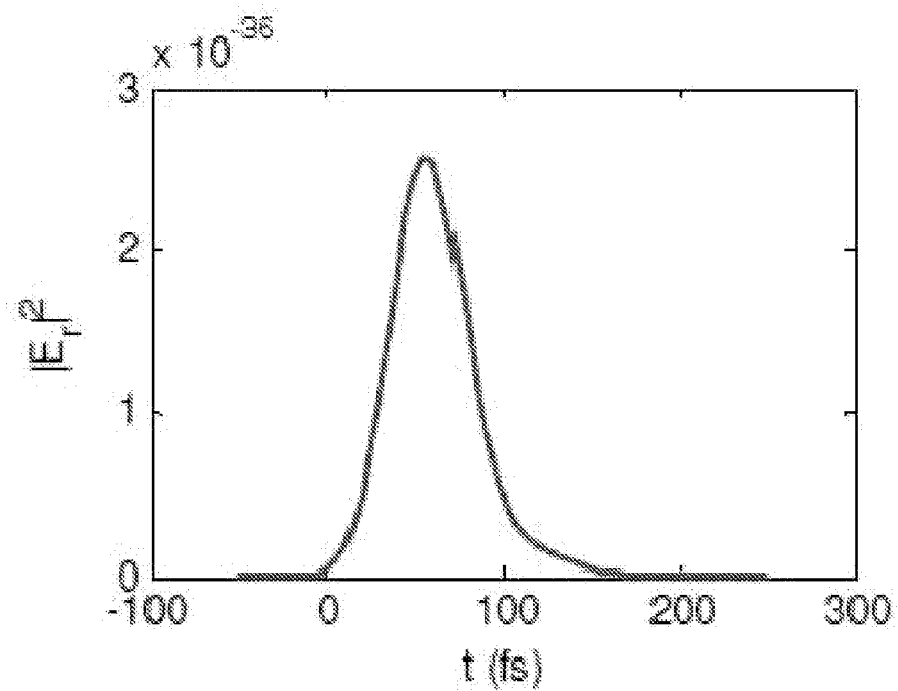
FIG. 12B shows a plot of reflected electric field squared versus time for a structure, in accordance with various embodiments.

FIG. 12A shows a plot of reflected electric field squared versus wavelength for the structure of Tables 8 and 9. FIG. 12B shows a plot of reflected electric field squared versus time for the structure of Tables 8 and 9.

Figure 13:
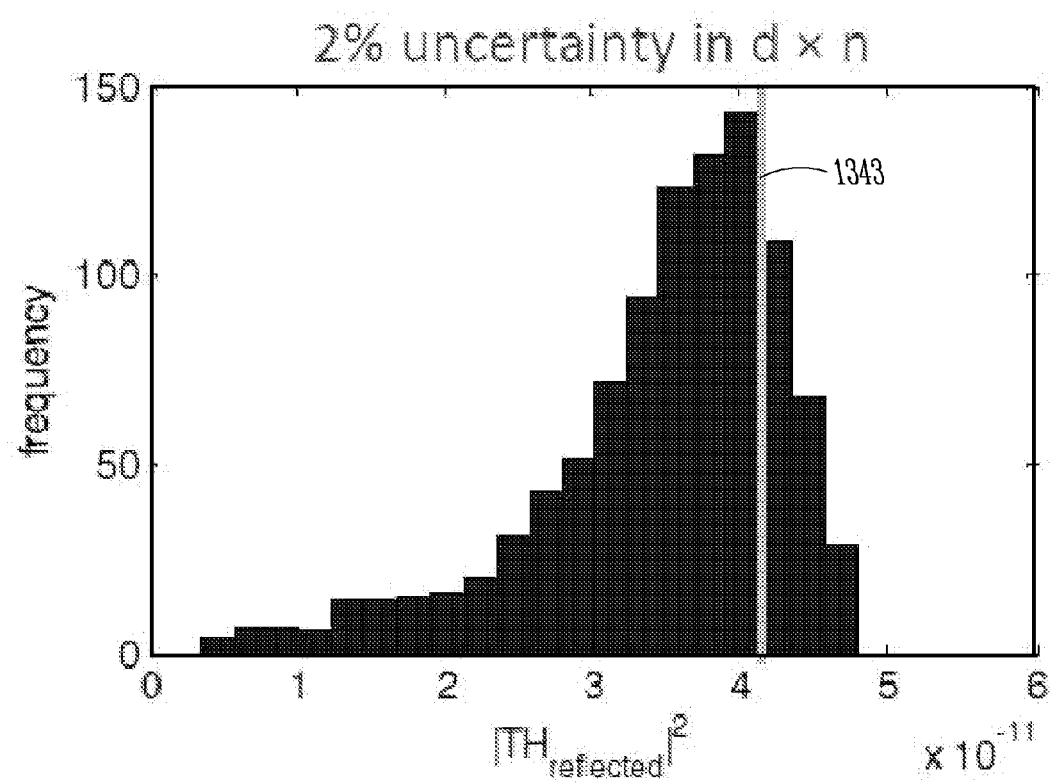
FIG. 13 is a plot of a sensitivity study for the structure of FIG. 11, in accordance with various embodiments.

FIG. 13 is a plot of a sensitivity study for the structure of FIG. 11 having the layers of Table 8. A 2% uncertainty was assumed on optical path (d×n) through the layers. FIG. 13 shows frequency versus $|TH_{reflected}|^2$ for the 2% uncertainty. Region 1343 is the expected TH with layer thickness as given in Table 8.

Figure 14A:
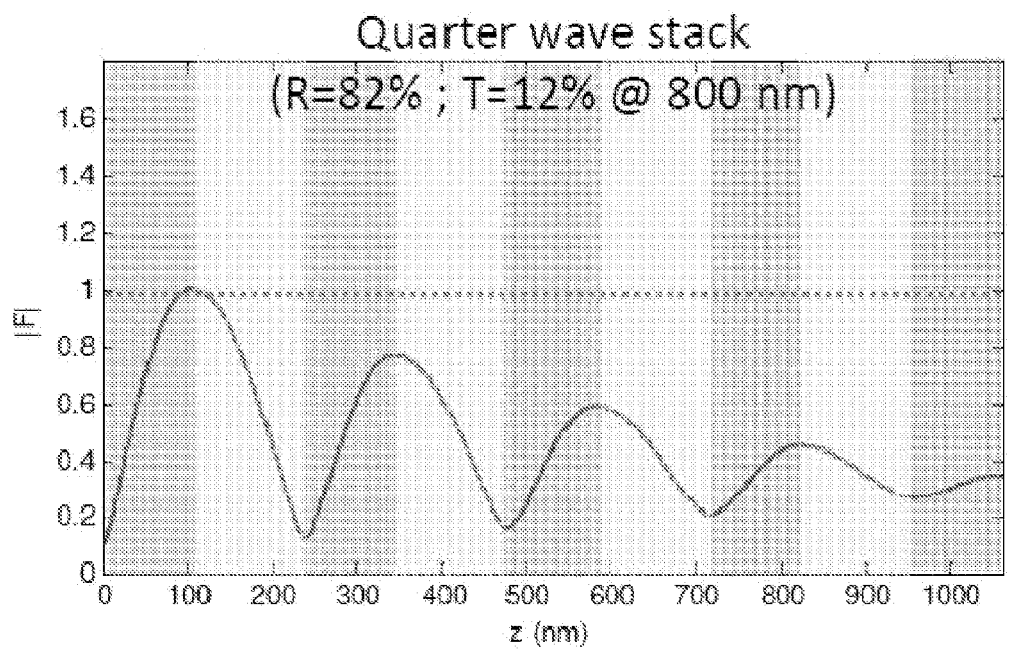
FIGS. 14A and 14B are plots of a fundamental field inside a film stack providing a comparison of quarter wave versus optimized stack for maximum reflected third harmonic, in accordance with various embodiments.
Figure 14B:
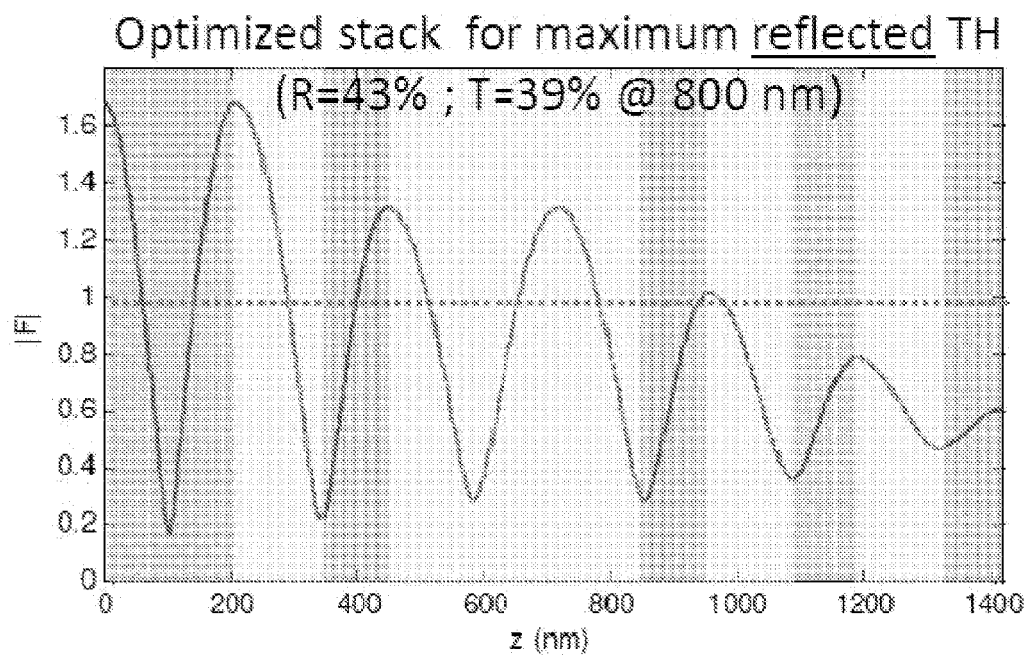

FIGS. 14A and 14B are plots of a fundamental field inside a film stack providing a comparison of quarter wave vs. optimized stack (N=9) for maximum reflected TH. The reference parameters of Table 3 are applicable to these figures. FIG. 14A is a plot for the quarter wave stack having alternating hafnia and silica layers, beginning and ending with hafnia and with R=82% and T=12% @ 800 nm. FIG. 14B is for an optimized stack for maximum reflected TH with R=43% and T=39% @ 800 nm.

Figures 15A, 15B:
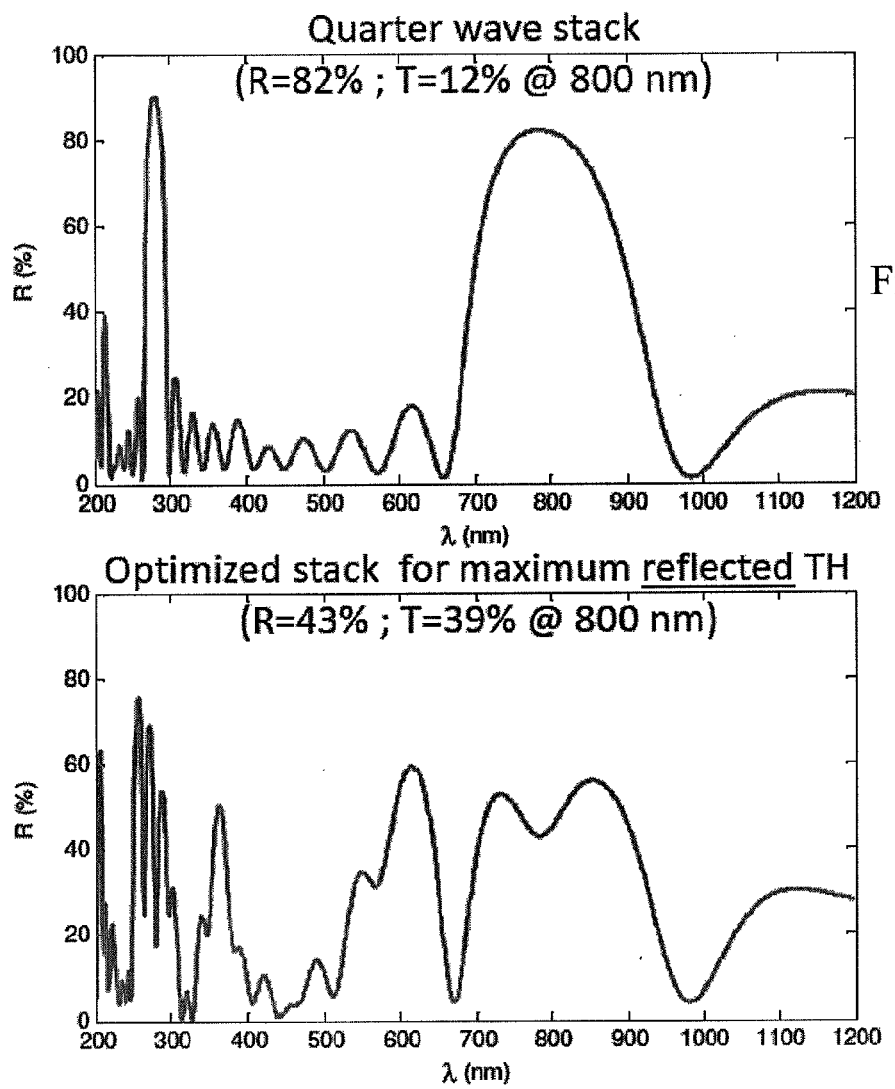
FIGS. 15A and 15B are plots of reflection versus wavelength providing a comparison of quarter wave versus optimized stack (N=9) for maximum reflected TH, in accordance with various embodiments.

FIGS. 15A and 15B are plots of reflection vs. wavelength providing a comparison of quarter wave vs. optimized stack (N=9) for maximum reflected TH. FIG. 15A is a plot of reflection vs. wavelength for the structure of FIG. 14A with R=82% and T=12% @ 800 nm. FIG. 15B is a plot of reflection vs. wavelength for the structure of FIG. 14B with R=43% and T=39% @ 800 nm.

Figure 16:
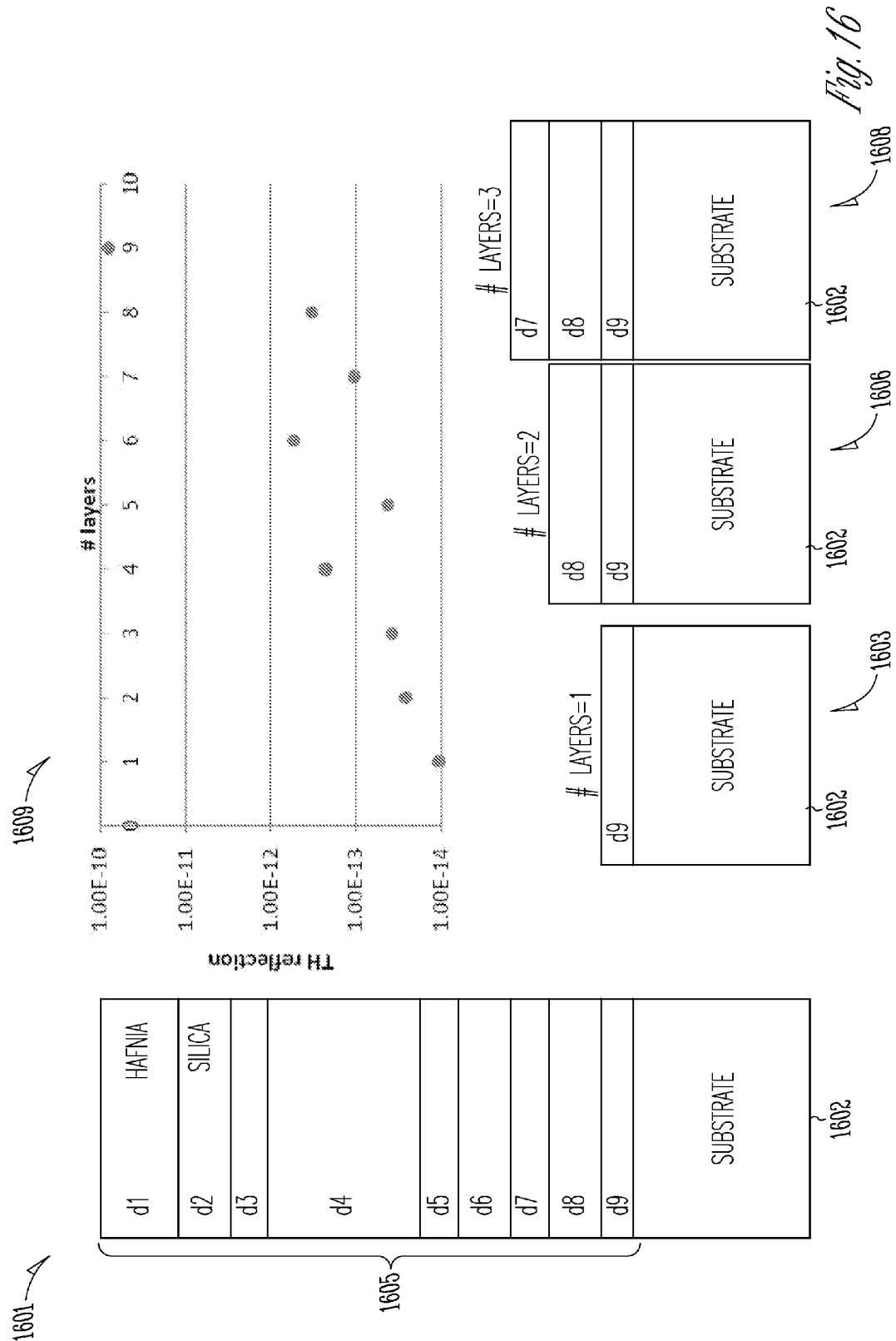
FIG. 16 shows a plot of reflected third harmonic as a function of layers of a stack as layers are added, in accordance with various embodiments.

FIG. 16 shows a plot 1609 of reflected TH as a function of layers of a stack 1605 as layers are added, based on optimizing a stack. An optimized sample 1601 has stack 1605 (N=9) disposed on a substrate 1602. Configuration 1603 is subjected to determining thickness to provide an optimized reflected TH for a single layer structured as the first layer disposed on substrate 1602 with the reflected TH value shown in plot 1609. Configuration 1606 is subjected to determining thickness to provide an optimized reflected TH for a second layer on the determined single layer disposed on substrate 1602 of configuration 1603 with the its reflected TH value shown in plot 1609. Configuration 1608 is subjected to determining thickness to provide an optimized reflected TH for a third layer on the determined second layer on the determined single layer disposed on substrate 1602 of configuration 1606 with the its reflected TH value shown in plot 1609. This procedures can continued for each subsequent layer of stack 1605. Note using the nomenclature that the first layer upon which a fundamental signal is incident is labeled layer 1, the first layer processed in designing the layers as shown in the procedure associated with FIG. 16 is labeled layer N, where N is the total number of layers in stack 1605. Though FIG. 16 shows hafnia alternating with silica in stack 1605, other materials can be used in stack 1605 with silica as a layer separating layers of the other selected material or materials.

Figure 17A:
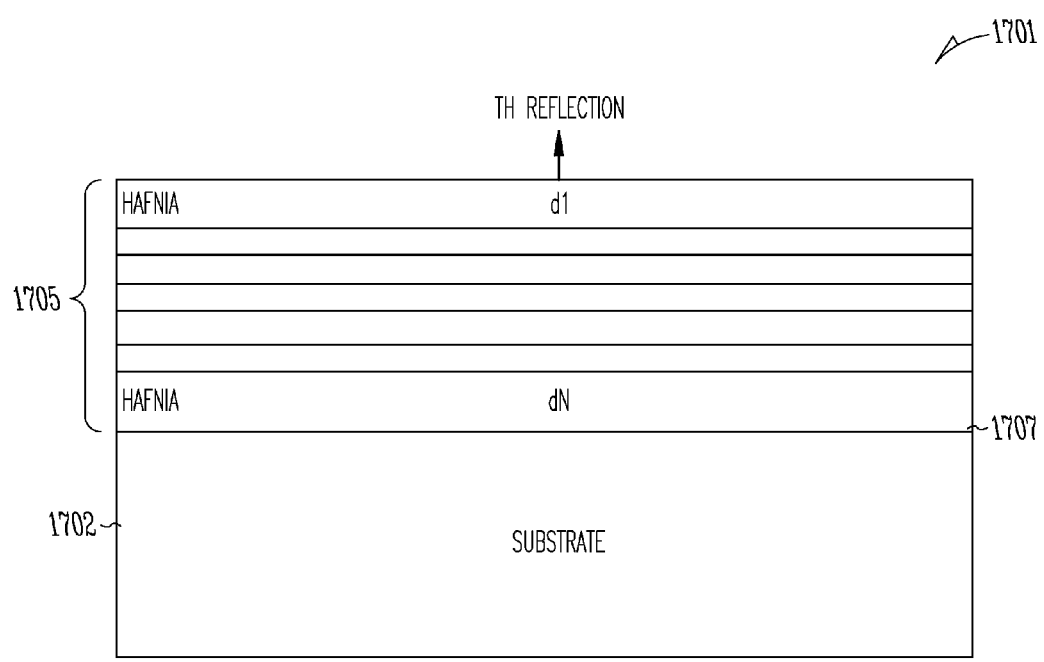
FIG. 17A is a representation of a structure having nine layers hafnia/silica in reflection as shown in FIG. 11 plus an 80% reflector on surface interface, in accordance with various embodiments.

FIG. 17A is a representation of a structure under the parameters of Table 9 with 9 layers hafnia/silica in reflection as shown in FIG. 11 plus an 80% reflector on surface interface. FIG. 17A shows an example configuration 1701 of N layers of hafnia and silica in a stack 1705 on a substrate 1702 for TH reflection. The layers alternate with a hafnia layer being the $N^{th}$ layer, having thickness $d_N$, adjacent and nearest to substrate 1702 and another hafnia layer being configured as the first layer of stack 1705, having thickness $d_1$ and disposed in stack 1705 furthest from the substrate. With this alternating structure, there is one more hafnia layer in stack 1705 than silica layer, and the hafnia layers are odd numbered layers and silica layers are even number of layers. The total hafnia thickness is D=627 nm. An 80% reflector 1707 for both fundamental and TH is disposed at the substrate interface between substrate 1702 and stack 1705. With an optimization algorithm applied to configuration 1701, the thickness of the layers in nanometers can be determined as shown in Table 10.

| | |
|---|---|
| d1 | 131.8 |
| d2 | 343.2 |
| d3 | 127.5 |
| d4 | 354.7 |
| d5 | 195.1 |
| d6 | 199.9 |
| d7 | 50.4 |
| d8 | 386.8 |
| d9 | 122.0 |

TABLE 10

| | |
|---|---|
| D hafnia | 627 |
| D silica | 1285 |
| Total D | 1912 |

Figure 17B:
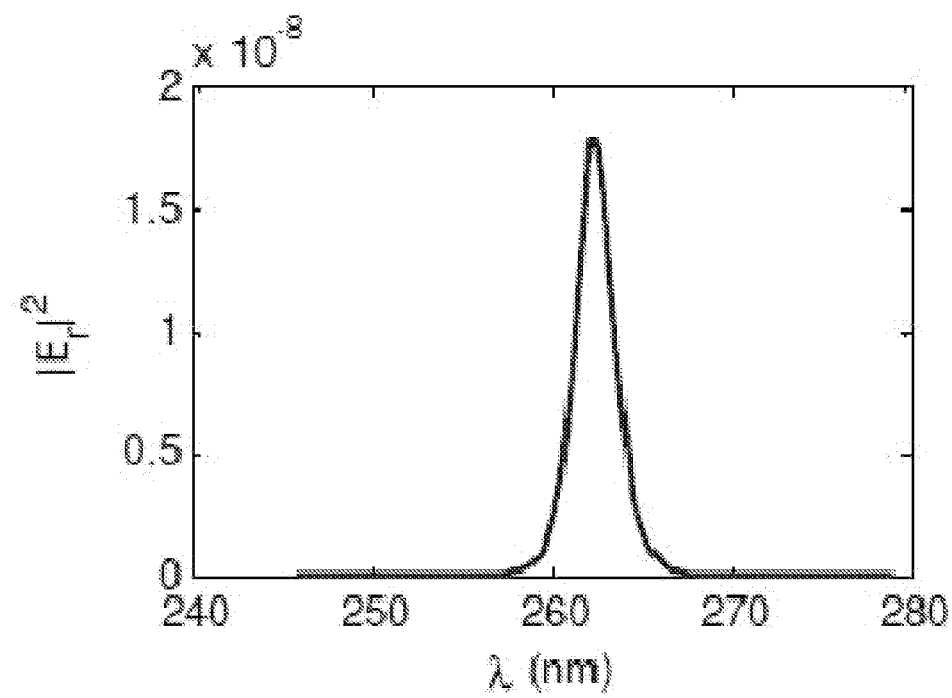
FIG. 17B shows a plot of reflected electric field squared versus wavelength for the structure of FIG. 17A, in accordance with various embodiments.
Figure 17C:
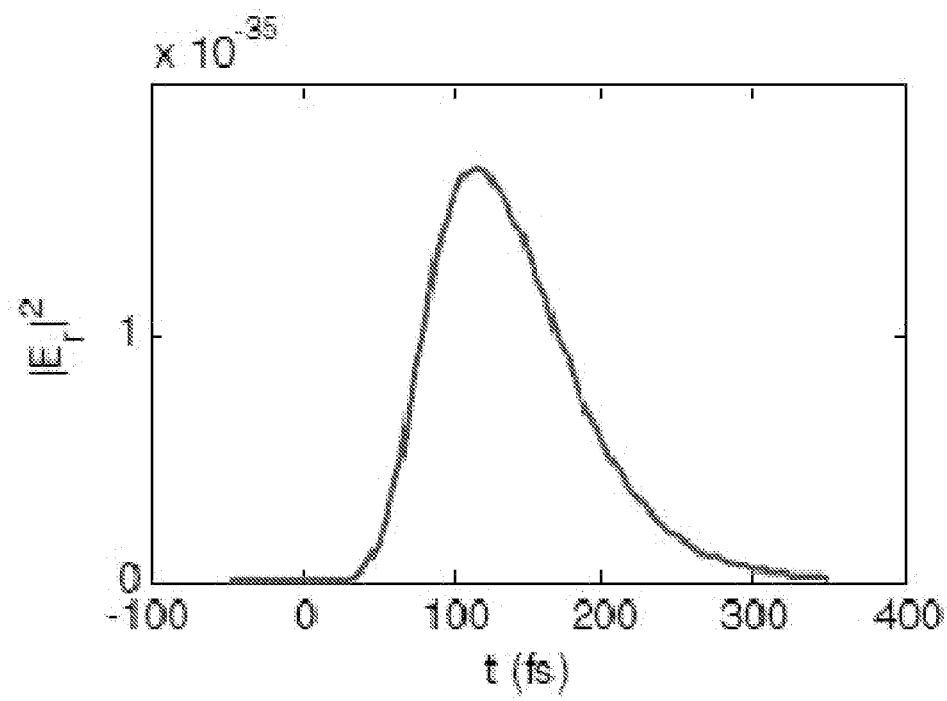
FIG. 17C shows a plot of reflected electric field squared versus time for the structure of FIG. 17A, in accordance with various embodiments.

FIG. 17B shows a plot of reflected electric field squared versus wavelength for the structure of FIG. 17A with respect to Tables 9 and 10. FIG. 17C shows a plot of reflected electric field squared versus time for the structure of FIG. 17A with respect to Tables 9 and 10.

Figure 18:
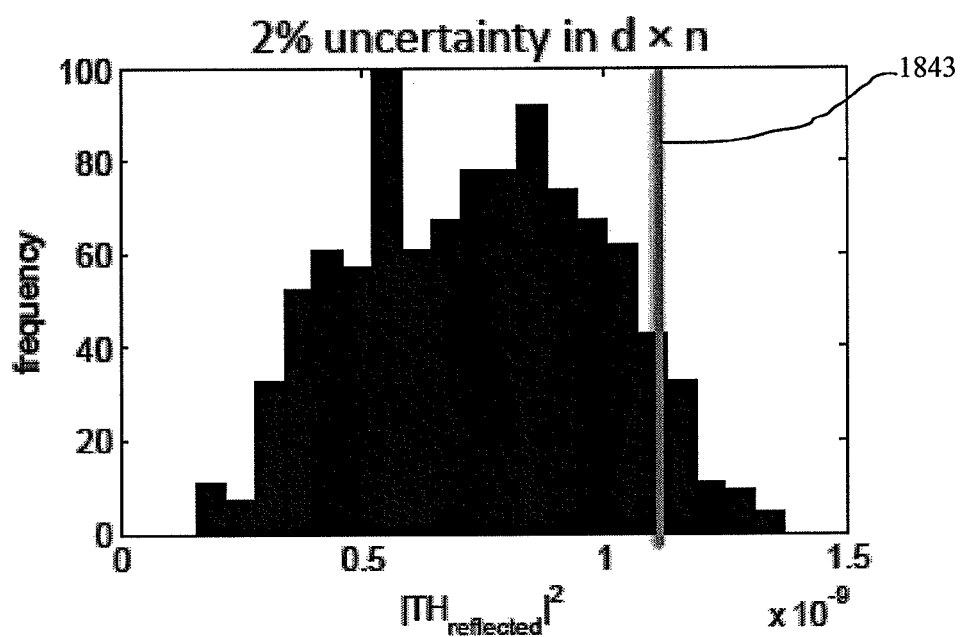
FIG. 18 is a plot of a sensitivity study for the structure of FIG. 17A, in accordance with various embodiments.

FIG. 18 is a plot of a sensitivity study for the structure of FIG. 17A having the layers of Table 10. A 2% uncertainty was assumed on optical path (d×n) through the layers. FIG. 18 shows frequency versus $|TH_{reflected}|^2$ for the 2% uncertainty. Region 1843 is the expected TH with layer thickness as given in Table 10.

Figure 19:
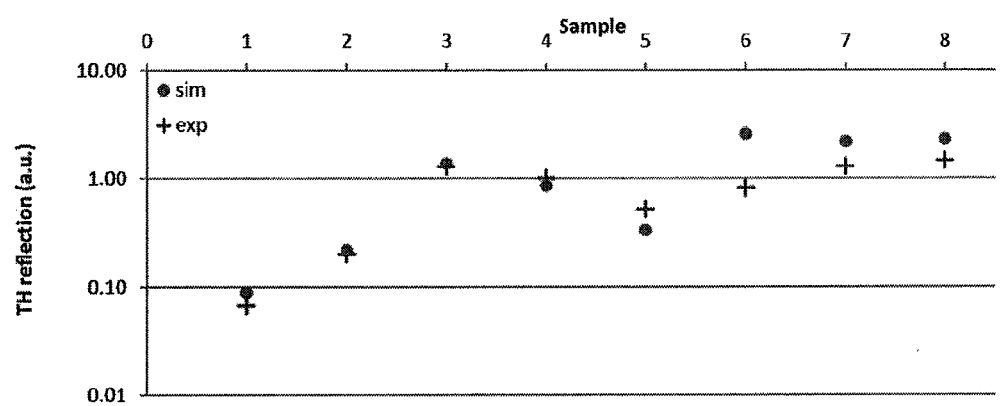
FIG. 19 shows third harmonic in reflection for eight samples both in experiment and model, in accordance with various embodiments.

Data discussed above with respect to stack configurations such as associated with FIGS. 7A, 9, 11, 16, and 17A were generated via a processor processing an algorithm to generate design parameters for the thickness of the layers of the respective stacks, given the selected materials and number of layers of the stack. FIG. 19 shows TH in reflection for eight samples both in experiment and model. Included is substrate contribution and pulse spectrum (50 fs). Table 11 lists the thickness of the sample stacks.

TABLE 11

| Sample # | |
|---|---|
| 1 | 1-layer 101.6 nm hafnia |
| 2 | 1-layer 154 nm hafnia |
| 3 | 1-layer 201.9 nm hafnia |
| 4 | 1-layer 405.5 nm hafnia |
| 5 | 2-layer sub/Hf/Si = 176/164 |
| 6 | 4-layer sub/Hf/Si/Hf/Si = 265.2/95/180/164 nm |
| 7 | 4-layer sub/Hf/Si/Hf/Si = 281/67/173/155 nm |
| 8 | 17-layer sub/LL(HL)$^8$H = QW @ 800 nm |

Figure 20:
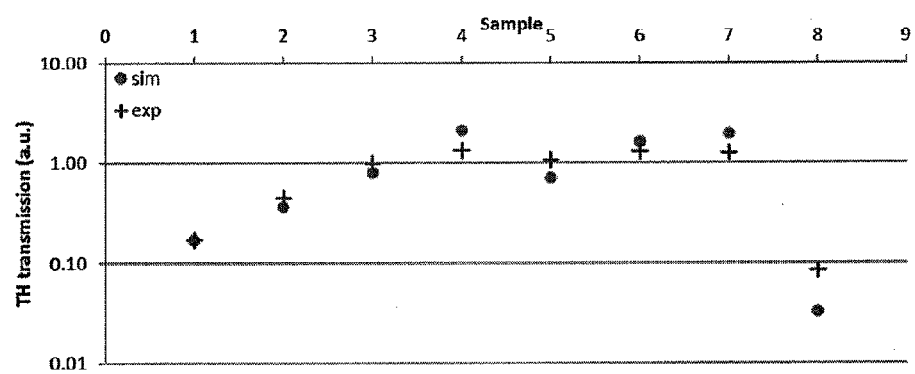
FIG. 20 shows third harmonic in transmission for the eight samples of FIG. 19 both in experiment and model, in accordance with various embodiments.

The circles in FIG. 19 are simulated values and the pluses are experimental values. In Table 11, sub refers to a substrate and QW refers to a quantum well and the superscript 8 refers to the number of repeated HL layers. FIG. 20 shows TH in transmission for the eight samples both in experiment and model in Table 11.

Figure 21:
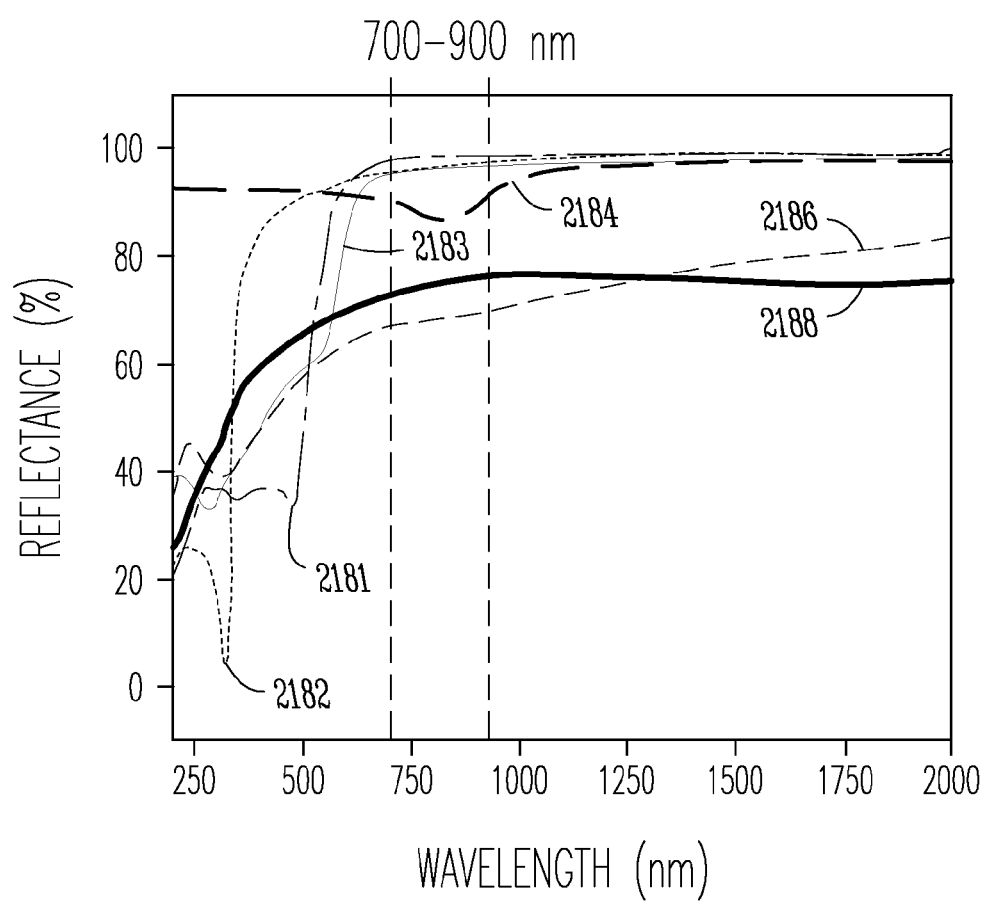
FIG. 21 are plots of reflectance of commonly used metals as a function of wavelength, in accordance with various embodiments.

As discussed above, a metallic layer can be added at the substrate-film interface to provide a reflector. The metallic layer may have a reflectivity of greater than or equal to 80%. FIG. 21 are plots of reflectance of commonly used metals as a function of wavelength from 200 to 2000 nm. The plot is from Wang B., Gallais L., "A theoretical investigation of the laser damage threshold of metal multi-dielectric mirrors for high power ultrashort applications", Optics Express, 21 14698 (2013), which was extracted from data in M. J. Webber, Handbook of Optical Materials (CRC Press, 2003). Curve 2181 is for aluminum. Curve 2182 is for silver. Curve 2183 is for cooper. Curve 2184 is for gold. Curve 2186 is for nickel. Curve 2188 is for platinum. From this article, which extracted data from various published references, a table showing a summary of ultra-short laser damage thresholds of metal films and bulk materials, in the case of single shot irradiation and in normal incidence, is provided below as Table 12.

| Samples | | Test conditions | LIDT |
|---|---|---|---|
| Film/ substrate | thickness (nm) | Wavelength, pulse duration | (J/cm$^2$) |
| Gold/fused silica | 100 | 400 nm, 200 fs | 0.025 |
| | 300 | | 0.058 |
| | 500 | | 0.095 |
| | 700 | | 0.11 |
| | 900 | | 0.112 |
| | 1500 | | 0.113 |
| Gold/ BK7 | 31 | 793 nm, 28 fs | 0.109 |
| | 51 | | 0.189 |
| | 70 | | 0.23 |
| | 90 | | 0.33 |
| | 135 | | 0.39 |
| | 147 | | 1.11 |
| | 295 | | 2.11 |
| | 900 | | 2.84 |
| Silver/ borosilicate | 200 | 800 nm, 120 fs | ≈0.9 |
| Silver/ BK7 | not given | 1054 nm, 400 fs | 0.69 |
| Silver/ Kapton ® | 100 | 1030 nm, 500 fs | 1.1 |

Figure 22:
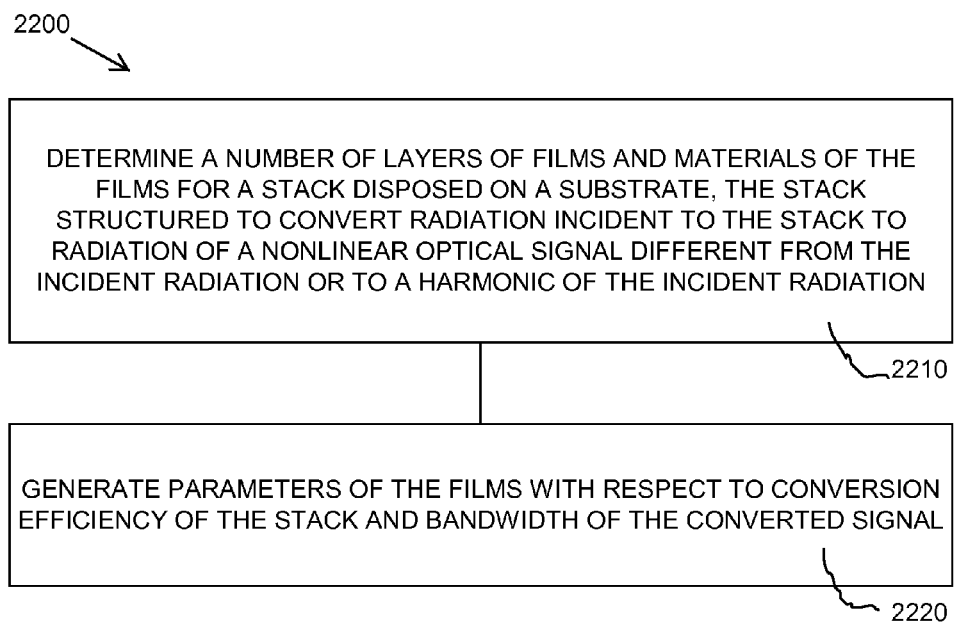
FIG. 22 is a flow diagram of an example method to generate a structure to convert radiation incident to the structure to radiation of a nonlinear optical signal different from the incident radiation or to a harmonic of the incident radiation, in accordance with various embodiments.

FIG. 22 is a flow diagram of an embodiment of an example method 2200 to generate a structure to convert radiation incident to the structure to radiation of a nonlinear optical signal different from the incident radiation or to a harmonic of the incident radiation. At 2210, a number of layers of films and materials of the films for a stack disposed on a substrate are determined for the stack structured to convert radiation incident to the stack to radiation of a nonlinear optical signal different from the incident radiation or to a harmonic of the incident radiation. The determination may be realized as an input to a processing system having a processor and a memory module. The determination may be realized by operation of the processing system based on the application to which the conversion is to be applied. The application may include operating parameters such as the wavelength of the incident radiation from one or more lasers to be used in the application.

At 2220, parameters of the films are generated with respect to conversion efficiency of the stack and bandwidth of the converted signal. Generating parameters can include generating parameters for the stack structured with respect to incident radiation including the mixing of a plurality of optical waves. Generating parameters can include generating parameters for the stack structured with respect to incident radiation being at one frequency and the converted radiation including radiation at two frequencies, the sum of the two frequencies equaling the frequency of the incident radiation. Generating parameters can include generating parameters for the stack structured to maximize output amplitude and optimize bandwidth and phase behavior of the converted radiation. The stack may be optimized. Optimizing relates to determining a value or values of the parameter or parameters of the films corresponding to a determined maximum of the desired converted radiation. The processing may be an iterative. The parameter generated for the stack may be thicknesses for each layer for the stack to provide a determined maximum for the radiation at the desired converted radiation. For a constraint on the thickness of the stack, the parameters may include the number of layers of material to be included in the stack. The stack design can also take into account permanent refractive index changes due to laser incubation (conditioning) and transient changes of the index due to nonlinear optical effects, for example the Kerr effect.

Method 2200 or a similar method can be realized as a method to generate a structure to frequency convert incident radiation from a frequency to radiation at a harmonic frequency, where the harmonic frequency is an integer multiple of the frequency of the incident radiant. At 2210 with respect to harmonic generation, a number of layers of films and materials of the films for a stack disposed on a substrate are determined for the stack structured to frequency convert incident radiation, using nonlinear optical harmonic generation, from a frequency to an integer multiple of the frequency. The determination may be realized as an input to a processing system having a processor and a memory module. The determination may be realized by operation of the processing system based on the application to which the conversion is to be applied. The application may include operating parameters such as the wavelength of the incident radiation from a laser to be used in the application.

At 2220 with respect to harmonic generation, parameters of the films are generated with respect to conversion efficiency of the stack and bandwidth of a directly generated harmonic of the frequency. The processing system can be structured to operate to determine a maximum of the desired harmonic according to a model of a stack including the determined number of layers of films and materials of the films for the stack disposed on the substrate. Generating the parameters of the films can include optimizing, via the processor, with respect to conversion efficiency and bandwidth of a directly generated third harmonic of the frequency. Optimizing relates to determining a value or values of the parameter or parameters of the films corresponding to a determined maximum of the desired generated harmonic. The processing may be an iterative. The parameter generated for the stack may be thicknesses for each layer for the stack to provide a determined maximum for the radiation at the desired harmonic frequency. For a constraint on the thickness of the stack, the parameters may include the number of layers of material to be included in the stack. The stack design can also take into account permanent refractive index changes due to laser incubation (conditioning) and transient changes of the index due to nonlinear optical effects, for example the Kerr effect.

Consider generating a third harmonic as the desired harmonic. In an approach, a number of layers can be assumed along with limits (lower and upper) of their thicknesses depending on material and deposition constraints for a structure to generate the third harmonic with respect to the operating parameters of a laser providing the incident radiation. A processing algorithm based on the model can be executed to find the sequence of individual layer thicknesses that maximizes the conversion efficiency. The resulting efficiency can be a combination of favorable phase behavior and local field enhancements in the layers that have nonzero nonlinear susceptibilities.

Other approaches may be used. Generating thickness of each layer with respect to conversion efficiency of the stack and bandwidth of a directly generated harmonic, may include beginning with one sheet or layer of material on the substrate and monitoring the third harmonic as the thickness of the this material layer is increased. The monitoring can be performed as a simulation or experimentally. As the thickness of the material is increased, the third harmonic will change increasing to a maximum and from the maximum decreasing back to zero, and then back to a maximum, back to zero, and so on. In generating the thickness for the first layer on the substrate, the thicknesses of an individual film that is not thicker than the thickness that is necessary to reach the first maximum may be used for the layer in the stack. The fact that the magnitude of the third harmonic decreases back to zero, if the layer thickness extends beyond this thickness for the first maximum, is due to the phase of the third harmonic and the phase of the fundamental changing to a phase difference that goes to $\pi$. The phase difference going to $\pi$ means that the third harmonic is reconverted into the fundamental, which condition is to be avoided for the desired output of the third harmonic. To avoid this reconversion, after a coherence length of the first material, another material may be added as a second layer that effectively puts the phase back together. For instance, with the layer on the substrate being a hafnium-based dielectric, silica can be the material added as the second layer, though other dielectrics may be used. Then, another layer, as a third layer, is added to the second layer such that a thickness of the third layer is equal to or less than a coherence length of its material to generate the third harmonic, and so forth. This process can continue for each of the number of layers to generate the thicknesses for these layers. After processing to determine these thicknesses for the determined number of layers and materials of the films of the stack, the stack can be constructed using conventional techniques according to the various parameters determined for the stack.

In method 2200 or in other methods similar to or identical to method 2200, generating parameters may include a number of additional features individually or in combination. Generating the parameters of the films can include optimizing, via the processor, such that conversion efficiency of the stack is maximized. In an embodiment, the conversion efficiency may be greater than or equal to 20%. In other embodiments, the conversion efficiency may be less than 20%. Generating the parameters of the films can include generating the parameters of the films based on the stack being structured to produce the harmonic in reflection from the stack. Generating the parameters of the films can include generating the parameters of the films based on the stack being structured to produce the harmonic in transmission through the stack.

Various components of a system can include implementations using a processor operable to determine parameters of films arranged as layers of a stack on a substrate with respect to conversion efficiency of the stack and bandwidth of a directly generated harmonic of a frequency of radiation incident on the stack. These implementations may include a machine-readable storage device having machine-executable instructions, such as a computer-readable storage device having computer-executable instructions, to: operate a processor in conjunction with a memory module to execute one or more models to generate characteristics of a structure to convert the radiation incident to the stack to radiation of a nonlinear optical signal different from the incident radiation or to a harmonic of the incident radiation, the stack having parameters selected with respect to conversion efficiency and bandwidth of the converted radiation. The instructions can include determining, in a processing system having a processor and a memory module, a number of layers of films and materials of the films for a stack disposed on a substrate, the stack structured to convert radiation incident to the stack to radiation of a nonlinear optical signal different from the incident radiation or to a harmonic of the incident radiation; and generating, in the processing system via operation of the processor, parameters of the films with respect to conversion efficiency of the stack and bandwidth of the converted signal.

Instructions to generate parameters may include a number of additional features individually or in combination. Generating parameters can include generating parameters for the stack structured with respect to incident radiation including the mixing of a plurality of optical waves. Generating parameters for the stack structured with respect to incident radiation can include the stack structured with respect to incident radiation being at one frequency and the converted radiation having radiation at two frequencies, the sum of the two frequencies equaling the frequency of the incident radiation. Generating parameters can include generating parameters for the stack structured to maximize output amplitude and optimize bandwidth and phase behavior of the converted radiation. The stack design can also take into account permanent refractive index changes due to laser incubation (conditioning) and transient changes of the index due to nonlinear optical effects, for example the Kerr effect.

The instructions can include determining, in the processing system, a number of layers of films and materials of the films for a stack disposed on a substrate, the stack structured to frequency convert incident radiation using nonlinear optical harmonic generation from a frequency to an integer multiple of the frequency; and generating, in the processing system via operation of the processor, parameters of the films with respect to conversion efficiency of the stack and bandwidth of a directly generated harmonic of the frequency.

Instructions to generate parameters may include a number of additional features individually or in combination. Generating the parameters of the films can include optimizing, via the processor, with respect to conversion efficiency and bandwidth of a directly generated third harmonic of the frequency. Generating the parameters of the films can include maximizing the conversion efficiency. Generating the parameters of the films can include determining film thickness of each film of the number of layers of films such that each film thickness is equal to or less than a thickness to reach a first maximum of the harmonic in material of the respective film, taking into account previously determined film thickness for the stack. Generating the parameters of the films can include generating the parameters of the films based on the stack being structured to produce the harmonic in reflection from the stack. Generating the parameters of the films can include generating the parameters of the films based on the stack being structured to produce the harmonic in transmission through the stack.

Instructions can include instructions to perform the operations of the example method associated with FIG. 22 or other procedures taught herein with respect to FIGS. 1-24. Further, machine-readable device such as a machine-readable storage device, herein, is a physical device that stores data represented by physical structure within the device. Examples of machine-readable storage devices include, but are not limited to, read only memory (ROM), random access memory (RAM), a magnetic disk storage device, an optical storage device, a flash memory, and other electronic, magnetic, and/or optical memory devices. The machine-readable device may be a machine-readable medium such as memory module 2450 of FIG. 24. While memory module 2450 is shown as a single unit, terms such as "memory module," "machine-readable medium," "machine-readable device," and similar terms should be taken to include all forms of storage media, either in the form of a single medium (or device) or multiple media (or devices), in all forms. For example, such structures can be realized as centralized database(s), distributed database(s), associated caches, and servers; one or more storage devices, such as storage drives (including but not limited to electronic, magnetic, and optical drives and storage mechanisms), and one or more instances of memory devices or modules (whether main memory; cache storage, either internal or external to a processor; or buffers). Terms such as "memory module," "machine-readable medium," "machine-readable device," shall be taken to include any tangible non-transitory medium which is capable of storing or encoding a sequence of instructions for execution by the machine and that cause the machine to perform any one of the methodologies taught herein. The term "non-transitory" used in reference to a "machine-readable device," "medium," "storage medium," "device," or "storage device" expressly includes all forms of storage drives (optical, magnetic, electrical, etc.) and all forms of memory devices (e.g., DRAM, Flash (of all storage designs), SRAM, MRAM, phase change, etc., as well as all other structures designed to store data of any type for later retrieval.

Figure 23:
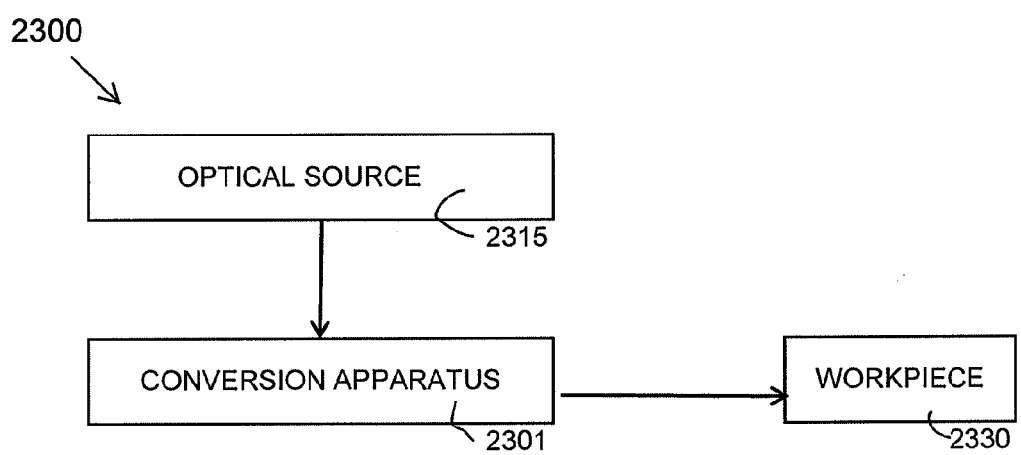
FIG. 23 is a block of a system to provide radiation at a desired frequency to a workpiece, in accordance with various embodiments.

FIG. 23 is a block of a system 2300 to provide radiation at a desired frequency to a workpiece 2330. System 2300 can comprise an optical source 2315 and a conversion apparatus 2301. Optical source 2315 can be realized as one or more lasers that can generate radiation at one or more frequencies. This allows for incident laser radiation to be used in mixing of optical waves or in harmonic generation. Optical source 2315 can be realized as a single laser 2315 that operates at a fundamental frequency. Herein, the frequency of a laser is its main operating frequency. Laser 2315 can be a femtosecond laser. Laser 2315 can be structured to provide incident radiation as taught according to the embodiments herein.

Conversion apparatus 2301 can be realized to include a substrate and a plurality of films on the substrate, the plurality of films structured in a stack, the stack arranged to receive radiation, the radiation including radiation at one or more frequencies, and structured to convert the radiation incident to the stack to radiation of a nonlinear optical signal different from the incident radiation or to a harmonic of the incident radiation, the stack having parameters selected with respect to conversion efficiency and bandwidth of the converted radiation. The stack can be structured with respect to incident radiation being at one frequency and the converted radiation including radiation at two frequencies, the sum of the two frequencies equaling the frequency of the incident radiation. The stack can be structured with respect to incident radiation including the mixing of a plurality of optical waves. The stack having parameters selected with respect to conversion efficiency and bandwidth of the converted radiation can include the stack structured to maximize output amplitude and optimize bandwidth and phase behavior of the converted radiation. The stack design can also take into account permanent refractive index changes due to laser incubation (conditioning) and transient changes of the index due to nonlinear optical effects, for example the Kerr effect.

Conversion apparatus 2301 can be realized to include a substrate and a plurality of films on the substrate, the plurality of films structured in a stack, the stack arranged to receive radiation from the laser at the fundamental frequency and structured to convert the radiation incident to the stack to radiation at an integer multiple of the fundamental frequency by use of nonlinear optical harmonic generation based on the stack, the stack having parameters selected with respect to conversion efficiency and bandwidth of a directly generated harmonic of the fundamental frequency. In an embodiment, materials of the films can include materials having a nonlinear susceptibility ratio between layers greater than twenty. This ratio may be less than twenty. In an embodiment, the stack can have a conversion efficiency that exceeds 20% with respect to received radiation from a laser having selected parameters. The conversion efficiency may be less than 20%. The parameters can be related to conversion efficiency and bandwidth of a directly generated third harmonic of the frequency. The harmonic generation is not limited to third harmonic generation, for example, the harmonic generated may be a fifth harmonic. The plurality of films may include a set of silica films disposed in the stack such that each silica film is located between two dielectric films of the plurality of films other than silica. Each film of the plurality of films may have a thickness optimized with respect to conversion efficiency, bandwidth, and/or phase (chirp) of the harmonic wave. The stack design can also take into account permanent refractive index changes due to laser incubation (conditioning) and transient changes of the index due to nonlinear optical effects, for example the Kerr effect.

The parameters of conversion apparatus 2301 may be related to conversion efficiency and bandwidth of a directly generated third harmonic of the fundamental frequency. The parameters are not limited to third harmonic generation, for example, the harmonic generated may be a fifth harmonic or another harmonic. The plurality of films can include one of more of hafnia, $Hf_xSi_{1-x}O_2$ with $0<x<1$, alumina, scandia, or other appropriate material for enhanced generation of harmonics. The stack can be structured to produce the harmonic in reflection from the stack. The stack can be structured to produce the harmonic in transmission through the stack. Conversion apparatus 2301 can be structured with features and/or combinations of features according to the teaching discussed with respect to FIGS. 1-22 to convert radiation incident to the stack of the conversion apparatus 2301 to nonlinear optical signal different from the incident radiation or to radiation at an integer multiple of the fundamental frequency by use of nonlinear optical harmonic generation.

Figure 24:
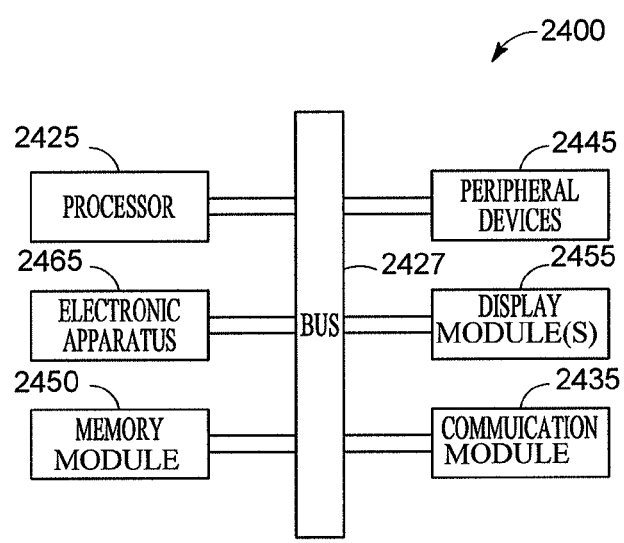
FIG. 24 is a block diagram of an example system operable to determine characteristics of a conversion apparatus to convert radiation incident to a stack of the conversion apparatus to radiation at an integer multiple of the fundamental frequency by use of nonlinear optical harmonic generation, in accordance with various embodiments.

FIG. 24 is a block diagram of an embodiment of an example system 2400 operable to determine characteristics of a conversion apparatus to convert the radiation incident to the stack to radiation of a nonlinear optical signal different from the incident radiation or to a harmonic of the incident radiation, the stack having parameters selected with respect to conversion efficiency and bandwidth of the converted radiation. System 2400 may include one or more features of components with respect to other figures and methods as discussed herein. System 2400 can include a processor 2425, a memory module 2450, a bus 2427, an electronic apparatus 2465, peripheral devices 2445, display module(s) 2455, and communication module 2435. In an embodiment, processor 2425 can be realized as a processor or a group of processors that may operate independently depending on an assigned function. Memory module 2450 can include one or more memory devices.

Memory module 2450 can include instructions stored thereon to operate according to algorithms and techniques discussed herein including, but not limited to, the methods associated with FIG. 22. Examples of machine-readable storage devices include, but are not limited to, read only memory (ROM), random access memory (RAM), a magnetic disk storage device, an optical storage device, a flash memory, and other electronic, magnetic, and/or optical memory devices. Memory module 2450 can be realized as any type of storage device. Memory module 2450 can provide a machine-readable storage medium, which can have instructions stored thereon such that when the instructions are executed by processor 2425, system 2400 can perform operations such as determining a number of layers of films and materials of the films for a stack disposed on a substrate, the stack structured to convert radiation incident to the stack to radiation of a nonlinear optical signal different from the incident radiation or to a harmonic of the incident radiation; and generating, via operation of the processor, parameters of the films with respect to conversion efficiency of the stack and bandwidth of the converted signal. Memory module 2450 can provide a machine-readable storage medium, which can have instructions stored thereon such that when the instructions are executed by processor 2425, system 2400 can perform operations such as determining a number of layers of films and materials of the films for a stack disposed on a substrate, the stack structured to frequency convert incident radiation using nonlinear optical harmonic generation from a frequency to an integer multiple of the frequency and generating parameters of the films with respect to conversion efficiency of the stack and bandwidth of a directly generated harmonic of the frequency, according to the teachings herein.

Bus 2427 can provide electrical conductivity among the components of system 2400. Bus 2427 can include an address bus, a data bus, and a control bus, each independently configured. Bus 2427 can be realized using a number of different communication mediums that allows for the distribution of components of system 2400. Use of bus 2427 can be regulated by processor 2425.

Display modules 2445 can be arranged to provide a user interface to input parameters for the processing performed by system 2400 using various algorithms and techniques as taught herein. In various embodiments, electronic apparatus 2435 can include additional display modules, additional storage memory, and/or other control devices that may operate in conjunction with processor 2425 and/or memory 2430.

Although specific embodiments have been illustrated and described herein, it will be appreciated by those of ordinary skill in the art that any arrangement that is calculated to achieve the same purpose may be substituted for the specific embodiments shown. Upon studying the disclosure, it will be apparent to those skilled in the art that various modifications and variations can be made in the devices and methods of various embodiments of the invention. Various embodiments can use permutations and/or combinations of embodiments described herein. Other embodiments will be apparent to those skilled in the art from consideration of the specification and practice of the embodiments disclosed herein. It is to be understood that the above description is intended to be illustrative, and not restrictive, and that the phraseology or terminology employed herein is for the purpose of description.

What is claimed is:

1. An apparatus comprising:
a substrate; and
a plurality of films on the substrate, the plurality of films structured in a stack, the stack arranged to receive radiation, the radiation including radiation at one or more frequencies, and structured to convert the radiation incident to the stack to radiation of a nonlinear optical signal different from the incident radiation, wherein each film of the plurality of films contributes to the nonlinear optical signal such that the nonlinear optical signal from the stack at one or more frequencies is larger than a sum of the corresponding nonlinear signal intensities from each film through a combination of field enhancement in the films and global phase mismatch compensation.

2. The apparatus of claim 1, wherein the stack is structured with respect to incident radiation being at one frequency and the radiation produced from the conversion consisting of radiation of several frequency components, the sum of the several frequency components equaling the frequency of the incident radiation.

3. The apparatus of claim 1, wherein the stack is structured with respect to incident radiation including the mixing of a plurality of optical waves.

4. The apparatus of claim 1, wherein the stack is structured to maximize output amplitude and optimize bandwidth and phase behavior of the converted radiation.

5. The apparatus of claim 1, wherein the stack is structured with respect to incident radiation having several frequency components and the radiation produced from the conversion is radiation of one frequency, the one frequency being a sum of the several frequency components of the incident radiation.

6. The apparatus of claim 1, wherein the stack is structured with respect to incident radiation of one frequency that produces output at a higher harmonic of the one frequency.

7. The apparatus of claim 1, wherein the radiation produced from the conversion includes radiation of a higher harmonic than radiation at a second harmonic.

8. An apparatus comprising:
a substrate; and
a plurality of films on the substrate, the plurality of films structured in a stack, the stack arranged to receive radiation, the radiation being at a frequency, and structured to convert the radiation incident to the stack to radiation at an integer multiple of the frequency by use of nonlinear optical harmonic generation based on the stack, wherein each film of the plurality of films contributes to the nonlinear optical signal such that the nonlinear optical signal from the stack is larger than a sum of the nonlinear signal intensities from each film through a combination of field enhancement in the films and global phase mismatch compensation.

9. The apparatus of claim 8, wherein the radiation at the integer multiple of the frequency is a directly generated third harmonic of the frequency.

10. The apparatus of claim 8, where the harmonic is a fifth harmonic of the frequency.

11. The apparatus of claim 8, wherein the plurality of films includes a set of silica films disposed in the stack such that each silica film is located between two dielectric films of the plurality of films other than silica.

12. The apparatus of claim 8, wherein each film of the plurality of films has a thickness optimized with respect to conversion efficiency, bandwidth, and/or phase of the radiation at the integer multiple of the frequency.

13. The apparatus of claim 8, wherein the plurality of films includes one of more of hafnia, $Hf_xSi_{1-x}O_2$ with 0<x<1, alumina, or scandia.

14. The apparatus of claim 8, wherein the stack is structured to produce the harmonic in reflection from the stack.

15. The apparatus of claim 8, wherein the stack is structured to produce the harmonic in transmission through the stack.

16. A system comprising:
    an optical source, the optical source being one or more lasers operable to provide one or more laser frequencies; and
    an apparatus including:
        a substrate; and
        a plurality of films on the substrate, the plurality of films structured in a stack, the stack arranged to receive radiation, the radiation including radiation at one or more frequencies, and structured to convert the radiation incident to the stack to radiation of a nonlinear optical signal different from the incident radiation, wherein each film of the plurality of films contributes to the nonlinear optical signal such that the nonlinear optical signal from the stack at one or more frequencies is larger than a sum of the corresponding nonlinear signal intensities from each film through a combination of field enhancement in the films and global phase mismatch compensation.

17. The system of claim 16, wherein the stack is structured with respect to incident radiation being at one frequency that produces output at a higher harmonic of the one frequency.

18. The system of claim 16, wherein the stack is structured with respect to incident radiation including the mixing of a plurality of optical waves.

19. The system of claim 16, wherein the stack is structured to maximize output amplitude and optimize bandwidth and phase behavior of the converted radiation.

20. The system of claim 16, wherein the optical source is arranged to provide laser radiation to the stack at a fundamental frequency, the stack arranged to receive the laser radiation from the optical source at the fundamental frequency and structured to convert the laser radiation incident to the stack to radiation at an integer multiple of the fundamental frequency by use of nonlinear optical harmonic generation based on the stack, the stack having parameters selected with respect to conversion efficiency and bandwidth of a directly generated harmonic of the fundamental frequency.

21. The system of claim 20, wherein the parameters are related to conversion efficiency, and bandwidth and phase of a directly generated third harmonic of the fundamental frequency.

22. The system of claim 20, where the harmonic is a fifth harmonic.

23. The system of claim 20, wherein the plurality of films includes a set of silica films disposed in the stack such that each silica film is located between two dielectric films of the plurality of films other than silica.

24. The system of claim 20, wherein each film of the plurality of films has a thickness optimized with respect to conversion efficiency, bandwidth, and/or phase of the radiation at the integer multiple of the fundamental frequency.

25. The system of claim 20, wherein the plurality of films includes one of more of hafnia, $Hf_xSi_{1-x}O_2$ with 0<x<1, alumina, or scandia.

26. The system of claim 20, wherein the stack is structured to produce the harmonic in reflection from the stack.

27. The system of claim 20, wherein the stack is structured to produce the harmonic in transmission through the stack.

28. The system of claim 20, wherein the laser is a femtosecond laser.

29. A method comprising:
    determining, in a processing system having a processor and a memory module, a number of layers of films and materials of the films for a stack disposed on a substrate, the stack structured to convert radiation incident to the stack to radiation of a nonlinear optical signal different from the incident radiation, the number of layers of films being a plurality of films and the radiation incident to the stack including radiation at one or more frequencies; and
    generating, in the processing system via operation of the processor, parameters of the films for each film of the plurality of films to contribute to the nonlinear optical signal such that the nonlinear optical signal from the stack at one or more frequencies is larger than a sum of the corresponding nonlinear signal intensities from each film through a combination of field enhancement in the films and global phase mismatch compensation.

30. The method of claim 29, wherein generating parameters includes generating parameters for the stack structured with respect to incident radiation including the mixing of a plurality of optical waves.

31. The method of claim 29, wherein generating parameters includes generating parameters for the stack structured to maximize output amplitude and optimize bandwidth and phase behavior of the converted radiation.

32. The method of claim 29, wherein determining the number of layers of films and materials of the films includes determining the number of layers of films and materials for the stack structured to frequency convert incident radiation using nonlinear optical harmonic generation from a frequency to an integer multiple of the frequency.

33. The method of claim 32, wherein generating the parameters of the films includes optimizing, via the processor, with respect to conversion efficiency and bandwidth of a directly generated third harmonic of the frequency.

34. The method of claim 32, wherein generating the parameters of the films includes generating the parameters of the films based on the stack being structured to produce the harmonic in reflection from the stack.

35. The method of claim 32, wherein generating the parameters of the films includes generating the parameters of the films based on the stack being structured to produce the harmonic in transmission through the stack.

36. A machine-readable storage device, having instructions stored thereof, the instructions when executed by one or more processors cause a machine to perform operations, the operations comprising:
    determining, in a processing system having the one or more processors and a memory module, a number of layers of films and materials of the films for a stack disposed on a substrate, the stack structured to convert radiation incident to the stack to radiation of a nonlinear optical signal different from the incident radiation, the number of layers of films being a plurality of films and the radiation incident to the stack including radiation at one or more frequencies; and generating, in the processing system via operation of the one or more processors, parameters of the films for each film of the plurality of films to contribute to the nonlinear optical signal such that the nonlinear optical signal from the stack at one or more frequencies is larger than a sum of the corresponding nonlinear signal intensities from each film through a combination of field enhancement in the films and global phase mismatch compensation.

37. The machine-readable storage device of claim 36, wherein generating parameters includes generating parameters for the stack structured with respect to incident radiation including the mixing of a plurality of optical waves.

38. The machine-readable storage device of claim 36, wherein generating parameters includes generating parameters for the stack structured to maximize output amplitude and optimize bandwidth and phase behavior of the converted radiation.

39. The machine-readable storage device of claim 36, wherein determining the number of layers of films and materials of the films includes determining the number of layers of films and materials for the stack structured to frequency convert incident radiation using nonlinear optical harmonic generation from a frequency to an integer multiple of the frequency.

40. The machine-readable storage device of claim 39, wherein generating the parameters of the films includes optimizing with respect to conversion efficiency and bandwidth of a directly generated third harmonic of the frequency.

41. The machine-readable storage device of claim 39, wherein generating the parameters of the films includes generating the parameters of the films based on the stack being structured to produce the harmonic in reflection from the stack or in transmission through the stack.

* * * * *

UNITED STATES PATENT AND TRADEMARK OFFICE
CERTIFICATE OF CORRECTION

PATENT NO. : 9,880,445 B1  
APPLICATION NO. : 14/744909  
DATED : January 30, 2018  
INVENTOR(S) : Rudolph et al.

Page 1 of 1

It is certified that error appears in the above-identified patent and that said Letters Patent is hereby corrected as shown below:

On the Title Page

In item (22), in "Filed", in Column 1, Line 1, after "2015", insert --¶Related U.S. Application Data (60) Provisional application No. 62/014,865, filed Jun. 20, 2014.--

On page 2, in Column 1, item (56), under "Other Publications", Line 14, delete ""Quasi-phasematching","" and insert --"Quasi-phase-matching",-- therefor On page 2, in Column 1, item (56), under "Other Publications", Line 17, delete "ferntosecond" and insert --femtosecond-- therefor On page 2, in Column 2, item (56), under "Other Publications", Line 2, delete "di raction" and insert --diffraction-- therefor On page 2, in Column 2, item (56), under "Other Publications", Line 15, delete "theorectical" and insert --theoretical-- therefor On page 2, in Column 2, item (56), under "Other Publications", Line 16, delete "multi-dialectric" and insert --multi-dielectric-- therefor In the Claims In Column 26, Line 62, in Claim 10, delete "where" and insert --wherein-- therefor In Column 27, Line 58, in Claim 22, delete "where" and insert --wherein-- therefor Signed and Sealed this  
Second Day of July, 2019

Andrei Iancu  
*Director of the United States Patent and Trademark Office*